United States Patent
Mattina

(10) Patent No.: US 12,508,109 B2
(45) Date of Patent: Dec. 30, 2025

(54) BONDING AUXILIARY DEVICE FOR ARTIFICIAL TEETH

(71) Applicant: EXOCAD GMBH, Darmstadt (DE)

(72) Inventor: Claudio Mattina, Darmstadt (DE)

(73) Assignee: EXOCAD GMBH, Darmstadt (DE)

( * ) Notice: Subject to any disclaimer, the term of this patent is extended or adjusted under 35 U.S.C. 154(b) by 445 days.

(21) Appl. No.: 17/926,262

(22) PCT Filed: May 21, 2021

(86) PCT No.: PCT/EP2021/063688
§ 371 (c)(1),
(2) Date: Nov. 18, 2022

(87) PCT Pub. No.: WO2021/239628
PCT Pub. Date: Dec. 2, 2021

(65) Prior Publication Data
US 2023/0200953 A1    Jun. 29, 2023

(30) Foreign Application Priority Data

May 25, 2020 (DE) .......................... 102020113928.4

(51) Int. Cl.
*A61C 11/08* (2006.01)
*A61C 11/00* (2006.01)
(Continued)

(52) U.S. Cl.
CPC ............ *A61C 11/08* (2013.01); *A61C 11/006* (2013.01); *A61C 13/0004* (2013.01); *A61C 13/01* (2013.01); *A61C 13/1016* (2013.01)

(58) Field of Classification Search
CPC ... A61C 11/08; A61C 11/006; A61C 13/0004; A61C 13/01; A61C 13/1016
See application file for complete search history.

(56) References Cited

U.S. PATENT DOCUMENTS 3,983,628 A * 10/1976 Acevedo .............. A61C 11/082
433/24
4,705,476 A    11/1987 Blair
(Continued)

FOREIGN PATENT DOCUMENTS

DE    102005013459 A1    10/2006
DE    202006015388 U1    4/2007
(Continued)

OTHER PUBLICATIONS

"International Search Report" mailed Nov. 2, 2021, issued in the corresponding PCT Application No. PCT/EP2021/063688, filed May 21, 2021.
(Continued)

*Primary Examiner* — Nicholas D Lucchesi
(74) *Attorney, Agent, or Firm* — PERRY + CURRIER INC.

(57) ABSTRACT

The invention relates to a bonding auxiliary device (100) for arranging, aligning and fixing a plurality of artificial teeth (210) to be bonded into an artificial gingiva (220) of a dental prosthesis (200), the bonding auxiliary device (100) comprising: an occlusion device (110) for arranging and aligning the teeth (210) relative to one another, a support device (120) for supporting a prosthetic body (221) of the first dental prosthesis (200) comprising the gingiva (220), and a clamping element (140) for fixing the teeth (210), which are arranged and aligned by means of the occlusion device (110), in the gingiva (220) supported by the support device (120).

18 Claims, 17 Drawing Sheets

(51) Int. Cl.
*A61C 13/00* (2006.01)
*A61C 13/01* (2006.01)
*A61C 13/36* (2006.01)

(56) References Cited

U.S. PATENT DOCUMENTS

| | | | | |
|---|---|---|---|---|
| 5,352,117 | A * | 10/1994 | Silva | A61C 11/001 433/34 |
| 6,139,321 | A * | 10/2000 | MacCulloch | A61C 13/1016 433/196 |
| 7,670,516 | B2 * | 3/2010 | Rusler | A61C 13/01 264/16 |
| 2010/0173258 | A1 * | 7/2010 | Boltanski | A61C 11/087 433/57 |
| 2012/0276502 | A1 | 11/2012 | Marshall | |
| 2014/0342306 | A1 * | 11/2014 | Lerner | A61C 13/087 433/54 |
| 2016/0157972 | A1 * | 6/2016 | Hagenbuch | A61C 13/0004 433/192 |
| 2016/0256247 | A1 * | 9/2016 | Watzke | A61C 13/1016 |
| 2019/0090995 | A1 | 3/2019 | Ruppert et al. | |
| 2019/0314121 | A1 * | 10/2019 | Nakao | A61C 8/0062 |
| 2020/0030063 | A1 | 1/2020 | Ruppert et al. | |
| 2020/0038160 | A1 * | 2/2020 | Hornung | B33Y 50/00 |
| 2023/0157796 | A1 * | 5/2023 | Kohnen | A61C 13/0004 433/213 |
| 2023/0372070 | A1 * | 11/2023 | Schnitzspan | B33Y 80/00 |
| 2025/0049545 | A1 * | 2/2025 | Rubbert | A61C 13/0004 |
| 2025/0049546 | A1 * | 2/2025 | Rubbert | A61C 8/0013 |
| 2025/0050451 | A1 * | 2/2025 | Rubbert | B23K 26/0624 |
| 2025/0228650 | A1 * | 7/2025 | Samoel | A61C 13/0004 |

FOREIGN PATENT DOCUMENTS

| | | |
|---|---|---|
| DE | 202015104617 U1 | 9/2015 |
| WO | 2008040400 A1 | 4/2008 |

OTHER PUBLICATIONS

"International Preliminary Report on Patentability" mailed Aug. 29, 2022, issued in the corresponding PCT Application No. PCT/EP2021/063688, filed May 21, 2021.

* cited by examiner

BONDING AUXILIARY DEVICE FOR ARTIFICIAL TEETH

The invention relates to a bonding auxiliary device for arranging, aligning and fixing a plurality of artificial teeth to be bonded into an artificial gingiva of a dental prosthesis. The invention furthermore relates to a system comprising a corresponding bonding auxiliary device, the teeth to be bonded and the artificial gingiva. The invention moreover relates to a method for producing an occlusion device for a corresponding bonding auxiliary device and to a method for using a corresponding bonding auxiliary device.

As part of the production of dental prostheses including artificial teeth, the teeth are usually bonded, for example by way of polymerization, into an artificial gingiva of the dental prosthesis, which is configured as a denture base, using a bonding agent. To allow the teeth to be introduced into the gingiva together with the bonding agent, receptacles of the gingiva for receiving the teeth have a clearance, that is, a certain freedom of movement for the teeth. The teeth are movable in the gingiva as long as the soft bonding agent has not cured. This makes it considerably more difficult to precisely position the teeth. This applies even more due to the fact that the position of the teeth usually has to be precisely maintained over an extended time period for the bonding agent to cure so as to be able to ensure precise positioning of the teeth.

In contrast, it is the object of the invention to create a bonding auxiliary device which simplifies the bonding of artificial teeth into an artificial gingiva for producing a dental prosthesis.

The object underlying the invention is achieved by the respective features of the independent claims. Embodiments of the invention are described in the dependent claims.

The bonding auxiliary device comprises three components, for example. A first component, for example an occlusion device, comprises one or more impressions of teeth or dental impressions. A second component, for example a support device, comprises one or more support elements. A third component, for example a clamping element, is configured to apply pressure onto the first and second components, for example. The three components, for example, can be arranged or are arranged in such a way that the pressure applied by the clamping element onto the support device is directed toward the dental impressions of the occlusion device, and that the pressure applied by the clamping element onto the occlusion device is directed toward the support elements of the support device. For example, the support device and the occlusion device can be arranged or are arranged in such a way that the dental impressions of the occlusion device face the support elements of the support device while the pressure is being applied. The clamping element is configured, for example, to make contact, either directly or indirectly by way of intermediate components, with the occlusion device and the support device so as to apply the pressure. For example, the clamping element is connected to the occlusion device and/or support device so as to be non-destructively detachable or not to be non-destructively detachable. For example, the clamping element is configured in one piece with the occlusion device and/or support device.

For example, a bonding auxiliary device for arranging, aligning and fixing a plurality of first artificial teeth to be bonded into a first artificial gingiva of a first dental prosthesis is provided. The bonding auxiliary device comprises an occlusion device for arranging and aligning the first teeth relative to one another according to a predefined occlusion, a first support device for supporting a first prosthetic body of the first dental prosthesis, comprising the first gingiva, including one or more first support elements, which are arranged on a first side of the first support device, and a clamping element for fixing the first teeth, which are arranged and aligned by means of the occlusion device, in the first gingiva. On a first side, the occlusion device comprises first impressions of dental crown upper sides of the first teeth according to the predefined occlusion, in which the dental crowns of the first teeth can be positioned for arrangement and alignment. The clamping element is configured to apply pressure onto a second side of the occlusion device facing away from the first side, and onto a second side of the first support device facing away from the first side, for fixing the first teeth, which are arranged and aligned by means of the occlusion device, in the first gingiva of the first prosthetic body that is supported by means of the first support device.

This could have the advantage that the occlusion device makes it possible to align the teeth to be bonded in precisely predefined positions with respect to one another. In this way, it can be ensured that the resulting occlusion corresponds to a predefined, that is, planned, occlusion for the dental prosthesis. In particular, it can thus be avoided that inadequate occlusion properties of the dental prosthesis are found after the teeth have been bonded, which make it necessary to produce a new dental prosthesis. This is important in particular since it also cannot be ensured for the new dental prosthesis, prior to a conclusive results test, such as in the mouth of the patient, that the occlusion properties thereof will in fact be satisfactory. This could have the advantage, for example, that placing the dental prosthesis back into an articulator, after bonding, for the purpose of testing the occlusion can be dispensed with since, for example, a precise occlusion can already be set by means of the bonding auxiliary device, or the bonding auxiliary device can be configured for setting such a precise occlusion.

The clamping device can furthermore ensure that the teeth can be consistently fixed in the alignment achieved by means of the occlusion device during a curing process of the bonding agent. In this way, undesirable shifting of the teeth during the curing process can be avoided.

The support device including the support elements can provide stable support to the prosthetic body including the gingiva. For example, an underside of the prosthetic body situated opposite the gingiva or facing away from the gingiva is adapted to a geometry of the jaw and the natural gingiva of the patient for whom the corresponding dental prosthesis is intended. Such oral cavity geometries are generally complex and irregular. The underside of the prosthetic body, for example, represents an impression, that is, a negative imprint, of the corresponding geometry of the jaw and of the natural gingiva to which it is adapted. The underside of the prosthetic body, for example, has a similarly complex and potentially irregular geometry. The corresponding geometry of the jaw and of the natural gingiva of the patient is scanned, for example, and used as a template for the underside of the prosthetic body including the artificial gingiva so as to ensure that the dental prosthesis fits as precisely as possible. It may be possible to ensure that even such a complex geometry can be efficiently supported. Efficient support can, for example, be achieved by means of a settable three point support, support by a plurality of elastic support elements that conform to the geometry, or by support surfaces of one or more support elements that agree with the shape of the natural gingiva of the patient, that is, represent a positive imprint thereof.

This shape of the natural gingiva of the patient, for example, conforms precisely to the shape of the underside of the prosthetic body that is adapted to the natural gingiva. The shape of the natural gingiva of the patient can, for example, be detected by means of a scan and provided for use as a template for the production of corresponding support elements.

When the dental prosthesis is arranged between the support device and the occlusion device, that is, the teeth are positioned by means of the occlusion device in the gingiva of the prosthetic body supported by means of the support device, the clamping device can apply a constant pressure in each case onto the sides of the occlusion device and of the support device facing away from the dental prosthesis. In this way, a constant pressure can be applied onto the teeth by way of the occlusion device, and a constant pressure can be applied onto the gingiva by way of the support device. The teeth can be fixed in one or more receptacles of the gingiva intended to receive the corresponding teeth by means of the pressure. It can be ensured in the process that constant pressure can be maintained by the clamping element, which suppresses shifts in positions of the teeth themselves as part of a protracted curing process.

This could furthermore have the advantage that the dental prosthesis including the teeth that are fixed in the artificial gingiva by means of the bonding auxiliary device can be checked for precise positioning before the bonding agent has cured. The fixation of the teeth can prevent the teeth from inadvertently shifting. Furthermore, it is possible to check the distribution of the introduced bonding agent. For example, if too much bonding agent was introduced locally, causing the same to be pushed out of the receptacle of the teeth, this excess bonding agent can be removed prior to curing. Furthermore, it can be checked, for example, whether bonding agent is missing locally and potentially has to be added.

If deficiencies regarding the positioning of the teeth, the configuration of the teeth or the gingiva in relation to one another, or the introduced bonding agent are found, corrections can be carried out. The bonding auxiliary device can potentially be detached and, if necessary, one or more of the teeth or the prosthetic body including the gingiva can be replaced. In this way, it can be avoided that corresponding deficiencies are only discovered after curing, which could necessitate a complete replacement of the dental prosthesis.

Here, bonding shall be understood to mean producing an integral bond, using a bonding agent, that cannot be non-destructively detached. For example, a soft, for example liquid, bonding agent is introduced, and an integral bond that cannot be non-destructively detached is established when the bonding agent cures. The bonding comprises, for example, polymerization using a polymerization bonding agent. The artificial teeth are polymerized into the artificial gingiva using a polymerization process.

The bonding agent can be cured by means of light curing, for example. As part of the light curing process, for example, a curing process that includes polymerization, for example chain polymerization, takes place. Synthetic material is used, for example, as a bonding agent for a polymerization process. Depending on the application, the synthetic material can be a composite to achieve desired properties by means of mixed polymer products. The soft or plastic bonding agent is irreversibly cured in a light curing device, using a polymerization lamp, by means of light curing. Light curing makes a high degree of polymerization possible, allows the start of the polymerization process to be precisely determined, and enables rapid, complete polymerization.

The dental prosthesis can, for example, be introduced into the light curing device together, that is, simultaneously, with the bonding auxiliary device so as to fix the teeth at the precisely predetermined positions in the gingiva by means of the bonding auxiliary device during the entire polymerization process.

The dental prosthesis comprises a prosthetic body, which comprises an artificial gingiva. The artificial gingiva, for example, forms a surface of an upper side of the prosthetic body. The artificial gingiva comprises one or more receptacles in which a plurality of artificial teeth are arranged. The receptacles are configured to receive a bonding agent, in addition to the artificial teeth, for bonding the artificial teeth into the receptacles. For example, the receptacles of the gingiva for receiving the teeth have a clearance, that is, a certain freedom of movement for the teeth, so that the bonding agent can be accommodated, in addition to the teeth. An underside of the prosthetic body situated opposite the artificial gingiva or facing away from the gingiva is configured to be arranged on a natural gingiva of a patient. For example, the underside has the shape of an impression of the natural gingiva. The dental prosthesis is a full or partial prosthesis, for example.

The plurality of artificial teeth comprises, for example, one or more individual teeth and/or a plurality of teeth connected to one another, for example in the form of one or more bridges. The plurality of artificial teeth can form a partial dental arch or a full dental arch, for example. The artificial teeth comprise, for example, printed and/or milled teeth, for example in the form of one or more individual teeth and/or one or more bridges.

The prosthetic body is a printed and/or milled prosthetic body, for example. The artificial gingiva is a printed and/or milled gingiva, for example. The artificial gingiva comprises one or more receptacles for receiving the artificial teeth as well as the bonding agent for fixing in place, for example fixing by polymerization, the artificial teeth arranged in the receptacles. For example, the one or more receptacles are planned and incorporated into the artificial gingiva so as to be fillable with a bonding agent, into which the artificial teeth to be bonded are introduced.

For example, the support device is designed in a plate-shaped manner, that is, as a support plate. For example, the occlusion device is designed in a plate-shaped manner, that is, as an occlusion plate.

For example, the clamping element establishes direct contact with the occlusion device and/or the first support device for applying the pressure. This could have the advantage that the pressure, that is, the force per unit area, exerted onto the occlusion device and/or the support device, and thus onto the teeth and gingiva in direct contact with the occlusion device or the support device, can be precisely controlled. In this way, it is possible, for example, to precisely set the pressure that is exerted onto the bonding agent situated between the teeth and the gingiva. If the pressure is too low, the fixation of the teeth may be insufficient, and shifting may occur. Furthermore, the risk exists that the bonding agent in the receptacles of the gingiva is not fully distributed between the teeth and the gingiva. This can result in voids, which can impair the retention of the teeth in the finished dental prosthesis. If the pressure is too high, there is a risk that too much bonding agent is pushed out of the region between the teeth and the gingiva and, for example, that too little bonding agent remains locally between the teeth and the gingiva to be able to ensure stable retention of the teeth after the bonding agent has cured.

For example, the clamping element is configured to apply the pressure onto the occlusion device and/or the first support device by way of one or more intermediate elements. For example, the bonding auxiliary device can be configured to simultaneously serve as a bonding auxiliary device for two dental prostheses. One of the two dental prostheses is a dental prosthesis for an upper jaw of a patient, for example, while the other dental prosthesis is a dental prosthesis for a lower jaw of the patient, for example. The occlusion device is arranged, for example, between the teeth of the two dental prostheses, and the prosthesis bodies of the two dental prostheses including the gingivae are in each case supported by a support device, onto which the clamping element applies the pressure. In this case, the pressure is not directly applied onto the occlusion device by the clamping element, for example, but by way of intermediate elements in the form of the second dental prosthesis and the second support device. This could have the advantage that, in this way, the pressure applied onto the teeth and gingivae of both dental prostheses can be controlled simultaneously and, as a result, the pressure exerted on the bonding agent can be set precisely, for example, in both dental prostheses. This could have the advantage, for example, that placing the dental prostheses back into an articulator after bonding for testing the occlusion can be dispensed with since, for example, a precise occlusion can already be set by means of the bonding auxiliary device, or the bonding auxiliary device can be configured for setting such a precise occlusion.

For example, the one or more first support elements, as part of the support process, make contact with the underside of the first prosthetic body, which comprises the first gingiva, and support this underside or transfer the pressure applied by the clamping element onto the first support device to the underside. This could have the advantage that the support elements can be adapted to the geometry of the underside of the prosthetic body so as to provide effective support. For example, these can be generic support elements, which are made of an elastic material, for example, and conform to the corresponding geometry. As an alternative, these can be support elements, the position and/or length of which can be adapted to the corresponding geometry, for example to provide three-point support. Using three points that are not located on a shared line, it is possible, for example, to support surface areas having any arbitrary geometry. When using the minimum necessary number of three support points, the adaptations necessary for stable support could be minimized, thereby enabling effective adaptation to arbitrary geometries. As an alternative, a plurality of support elements having differing lengths can be provided, so that support elements having lengths suitable for the corresponding geometry can be selected from the provided plurality. As an alternative, the support elements can be prosthesis-specific, and thus patient-specific, support elements, which comprise a support surface representing an impression of a provided contact surface of the underside of the prosthetic body. The corresponding support elements are, for example, specifically configured to support the individual dental prosthesis and ensure a precisely fitting contact between the support surface and the contact surface.

For example, the support device is a prosthesis-specific or patient-specific support device, the size, shape and/or support elements used are specifically configured for an individual dental prosthesis. The support device is, for example, a generic support device, the use of which is not limited to an individual dental prosthesis for an individual patient. For example, the support device is a generic support device, which can in each case be individually set for the different dental prosthesis or patient. For example, the support device is a generic support device, the size, shape and/or support elements used are not specifically configured for an individual dental prosthesis. Such a generic support device can, for example, be used for different dental prostheses and/or possibly be adapted to different dental prostheses.

The occlusion device is, for example, a prosthesis-specific or patient-specific occlusion device, including prosthesis-specific or patient-specific first impressions of the dental crown upper sides of the first teeth. The occlusion is, for example, a prosthesis-specific or patient-specific occlusion. This could have the advantage that, when using patient-specific teeth or generic teeth, the position and/or alignment of which are to be adapted to patient-specific antagonists, it can be ensured that the teeth are arranged and aligned in such a precisely positioned manner that an occlusion that is customized to the individual patient can be implemented. In other words, it can be ensured that the corresponding dental prosthesis does not cause any occlusion-induced problems when inserted into the mouth of the patient.

For example, generic teeth, for example from a tooth library, can be used for the dental prosthesis, which may be used for different dental prostheses or for dental prostheses for different patients. In this case, the impressions of the occlusion device are, for example, not prosthesis-specific or patient-specific impressions, but generic impressions, for example.

For example, the clamping element comprises a setting device for setting a pressure that is applied onto the occlusion device and the first support device. This could have the advantage that a suitable pressure can be set by way of the setting device. For example, the pressure can be set in such a way that the bonding agent, as a result of the pressure, is distributed in the receptacles of the artificial gingiva and completely fills the spaces between the teeth arranged in the receptacles and the walls of the receptacles. The setting device for setting the pressure can, for example, comprise a screw device, for example including a threaded spindle, by way of which a distance can be set between the occlusion device and the support device and, as a result, the pressure that is exerted onto the dental prosthesis.

For example, the setting device comprises a spring having a settable spring constant and/or having a settable position. The setting device comprises, for example, a display for displaying the selected setting, so that a predefined setting can be selected for providing a predefined pressure.

For example, the clamping element is configured to apply a predefined pressure onto the occlusion device and the first support device. This could have the advantage that a predefined pressure is applied onto the occlusion device and the support device, and thus can be applied onto the teeth and the gingiva of a dental prosthesis arranged between the occlusion device and the support device. In this way, it can be ensured, for example, that a predefined pressure is applied onto the bonding agent between the teeth and the gingiva, which ensures that the bonding agent is fully distributed between the teeth and the gingiva, while preventing an excessive amount of bonding agent from being pushed out between the teeth and the gingiva.

The clamping element is, for example, a prosthesis-specific or patient-specific clamping element. The clamping element is, for example, a prosthesis-specific clamping element, which is configured to apply a prosthesis-specific predefined pressure onto the occlusion device and the first support device when the first dental prosthesis, including the first prosthetic body and the first teeth, is arranged between the occlusion device and the support device.

This could have the advantage that the clamping element can be configured to apply a predefined pressure onto a given dental prosthesis.

The clamping element is, for example, a generic clamping element, the use of which is not limited to an individual dental prosthesis for an individual patient. For example, the clamping element is a generic clamping element, which can in each case be individually set for different dental prostheses or patients. For example, the clamping element can be adapted to dimensions of an individual dental prosthesis so as to set a predefined pressure, which is applied onto the occlusion device and the support device as well as, ultimately, onto the teeth and the gingiva.

The clamping element comprises a spring, for example. The spring can, for example, be configured to generate a spring force, as a function of a position and/or a spring constant of the spring, which applies the predefined pressure onto the occlusion device and the first support device.

For example, a deflection of the spring during the application of the pressure onto the occlusion device and the first support device, including the first dental prosthesis arranged therebetween, is dependent on the position of the spring so that the spring force can be controlled via the position of the spring. For example, a deflection of the spring during the application of the pressure onto the occlusion device and the first support device, including the first dental prosthesis arranged therebetween, is dependent on a length of the spring at rest or a position of the spring at rest.

For example, the generated pressure, that is, the force per unit area, is determined by the spring force provided by the spring. This spring force is, for example, dependent on the deflection of the spring during the application of the pressure and on the spring constant of the spring. For example, the deflection is dependent on the position of the spring. By selecting a certain spring having a certain spring constant, which has a certain deflection when the pressure is being applied, for example as a function of a length at rest or a deflection at rest, and/or selecting the position of the spring, it is possible to set the spring force, and thus, for example, the applied pressure. For example, a plurality of different spring having different spring constants and/or dimensions are provided, from which a suitable spring is selected for generating the predefined pressure. The dimensions of the springs determine, for example, a deflection of the spring at rest.

For example, the spring can be replaced non-destructively. For example, a current spring can be replaced with a spring having a spring constant that is larger or smaller than the spring constant of the current spring and/or a different dimension than the current spring. In this way, it is possible, for example by selecting the spring that is used, to individually set the applied spring force, and thus the pressure applied onto the occlusion device and the first support device, including the first dental prosthesis arranged therebetween, for the first dental prosthesis.

For example, the position of the spring can be changed non-destructively. For example, a plurality of positions for the spring are predefined by the clamping element. For example, the position of the spring constant can be changed by changing from one predefined position to the next in discrete steps. In different positions, the spring, for example, has differing deflections during the application of the pressure onto the occlusion device and the first support device, including the first dental prosthesis arranged therebetween. For example, the spring force can be controlled via the selection of the position of the spring, including the respective position-dependent deflection. In this way, it is possible, for example by selecting the position of the spring, to individually set the applied spring force, and thus the pressure applied onto the occlusion device and the first support device, including the first dental prosthesis arranged therebetween, for the first dental prosthesis.

For example, the clamping element comprises a setting device for individually mechanically setting the force, for example by increasing or decreasing the force that is applied onto the support device and/or the occlusion device. In this way, for example, it would be possible to precisely set or adapt the pressure that is applied onto the artificial teeth and the artificial gingiva.

The clamping element comprises a first and a second leg, for example, which are connected to one another so as to be pivotable relative to one another about a shared pivot axis. The two legs are connected to one another via a spring that is arranged between the two legs.

This could have the advantage that the spring is expanded during relative pivoting of the legs and provides a spring force that counteracts the expansion. When the two legs are pivoted, for example so that a first end of the first leg makes contact with the second side of the occlusion device, and a second end of the second leg makes contact with the second side of the support device, the two ends are, for example, pushed onto the occlusion device and the support device by the spring counteracting the pivoting motion, so that these apply pressure thereon. The further the two legs are pivoted relative to one another, that is, are spread, the greater is the applied spring force and thus the applied pressure.

For example, the pivot axis is situated perpendicularly to the two legs or to a longitudinal extension direction of the respective legs. The spring is a torsion spring, for example. The pivot axis extends through the spring, for example. The spring is, for example, configured as a joint about which the two legs can be pivoted relative to one another. A torsion spring is a helically coiled or wound spring, for example a wire spring, which has two projecting straight ends or legs that are configured to introduce torque bending the spring windings. A torsion spring can be used as a joint for a rotational or pivoting motion, for example. For example, the spring can be another known type of spring, such as a helical spring.

The two legs of the clamping elements include a plurality of boreholes, for example, which are arranged along a longitudinal direction of the legs and configured to receive the legs of the torsion spring. This could have the advantage that the position of the torsion spring along the longitudinal direction of the legs can be changed in that the legs of the torsion spring are repositioned from a first pair of boreholes at a first position along the longitudinal direction of the legs into a second pair at a second position along the longitudinal direction of the legs.

For example, the legs of the clamping element in each case comprise a first and a second straight section, which form a flat angle with one another. The two legs are arranged in such a way, for example, that the two first leg sections, which each comprise the end making contact with the occlusion device or with the support device, extend parallel to one another, while the second sections are inclined with respect to one another. The ends of the second sections touch one another, for example.

The clamping element comprises a guide element, for example, which is configured to guide the movement of the two legs during a pivoting motion about the pivot axis. For example, the guide element has a circular arc shape. For example, the guide element is configured as a circular arc-shaped disk. For example, the guide element is connected to a first of the two legs and guided through a through-opening in the second leg. When the second leg is pivoted relative to the first leg, it is guided along the guide element.

For example, the clamping element comprises a limiting element, which is configured to limit the two ends of the legs, which are intended to make contact with the occlusion device and/or the support device, from approaching one another. For example, the corresponding ends are pulled toward one another by the spring. The limiting element ensures a minimum opening of the clamping element or a minimum distance between the corresponding ends. The limiting element can have the advantage that, as a result of the minimum distance between the ends of the legs, the additional opening path necessary to ensure a sufficient distance between the two ends, so that the support device and the occlusion device, including the dental prosthesis arranged therebetween, can be introduced between the corresponding ends, may be limited. The limiting element is an element, for example, that is provided as an alternative or in addition to the guide element. For example, the limiting element is configured to be straight or circular arc-shaped and attached to a first of the two legs, while extending toward the other leg and limiting the same from potentially approaching or pivoting toward the first leg. For example, the limiting element is integrated into the guide element. For example, the limiting section is a first section of the guide element which is arranged between the two legs and which has a larger diameter, for example a larger maximum diameter, than a second section of the guide element guided through the second leg. For example, a diameter of a cross-section of the limiting element, perpendicular to the extension direction of the through-opening in the second leg, in at least one direction is greater than a diameter of the through-opening through which the second section of the guide element extends, so that the limiting element does not fit through the through-opening, and limits potential pivoting of the second leg toward the first leg.

For example, the clamping element comprises one or more elastic arcs, which extend, for example, from the first support device to the occlusion device and have a spring constant that is configured to apply, by means of spring force, the predefined pressure onto the occlusion device and the first support device. The spring constant is, for example, a combination, such as a sum, of the spring constants of the individual arcs. This could have the advantage that the clamping element can have a simple design. The spring force exerting the pressure onto the occlusion device and/or the support device could result from the elasticity of the clamping element itself when the one or more arcs are bent open, so that mutually opposing ends of the one or more arcs can be pushed over the occlusion device and the support device, including the dental prosthesis arranged therebetween. For example, the clamping element is configured in one piece as one elastic arc or multiple mutually connected elastic arcs. For example, a plurality of clamping elements is used, which, for example, are each configured in one piece as an elastic arc.

For example, one or more of the arcs each have a semi-circular configuration. One or more of the arcs are circular arcs, for example. One or more of the arcs have a semi-elliptical configuration, for example. One or more of the corresponding semi-ellipses are, for example, a high or a wide semi-ellipse. In the case of the high semi-ellipse, the axis cutting the corresponding ellipse in half is the minor axis of the ellipse, which extends through the center and two vertices of the ellipse, but none of the foci. In the case of the wide semi-ellipse, the axis cutting the corresponding ellipse in half is the major axis of the ellipse, which extends through the center, two vertices as well as the two foci. One or more of the arcs are ellipse arcs, for example.

The clamping element has a one-piece configuration, for example. This could have the advantage that the clamping element is easy to produce. For example, the clamping element can be printed by means of a 3D printer or produced by means of a machining process, such as milling. For example, the clamping element comprises one or more elastic arcs. For example, the clamping element is configured as an elastic arc. For example, the clamping element is configured as a plurality of mutually connected elastic arcs. For example, the arcs are each connected to one another at one end or at both ends.

For example, the clamping element is configured in one piece together with the first support device and/or the occlusion device. This could have the advantage that the combination of clamping element and support device and/or occlusion device is easy to produce. For example, such a combination can be printed by means of a 3D printer or produced by means of a machining process, such as milling. For example, the clamping element is configured as an elastic arc extending from the support device and/or occlusion device. For example, the clamping element is configured as a plurality of elastic arcs extending from the support device and/or occlusion device. The clamping element connects the support device and the occlusion device, for example.

The clamping element is, for example, non-destructively detachably attached on the second side of the first support device and/or on the second side of the occlusion device, using a retaining element. This could have the advantage that the clamping element can be attached to the support device and/or the occlusion device before the teeth are arranged in the gingiva, and the corresponding dental prosthesis is arranged between the support device and the occlusion device. The retaining element can prevent the attachment from detaching as part of the introduction of the dental prothesis. This can be advantageous when the clamping element, for introduction, is to be bent open using only two hands. Using one hand, the dental prosthesis can be held by way of the occlusion device and/or support device, while the clamping element is bent open using the other hand, which is attached to the occlusion device and/or support device.

For example, the retaining element is a screw. The retaining element is, for example, an element of a known, preferably non-destructively detachable connection type, such as a plug connection, a clamping connection, a detent connection, or a bayonet catch, and the like. The retaining element is, for example, arranged at the center of the occlusion device and/or support device. For example, the retaining element is mounted by way of an elastic element, such as a rubber buffer or a spring element, through which the retaining element, for example in the form of a screw, extends. The elastic mount makes it possible, for example, to achieve compensation when using support elements having differing lengths, or in the case of differing dimensions of the dental prosthesis, such as differing alveolar crest conditions of the prosthetic body or of the artificial gingiva, for example so as to compensate for height levels, with the pressure applied onto all elements arranged between the support device and the occlusion device remaining the same.

For example, the retaining element is configured to enable a one-dimensional elastic lateral displacement of the first support device and/or of the occlusion device relative to the retaining element. For example, the one-dimensional elastic lateral displacement takes place along a displacement axis, which is situated perpendicularly to an extension plane of the first support device and/or the occlusion device. Such a lateral displaceability can be implemented by using an above-described elastic mount.

For example, the retaining element is configured to enable a rotation of the first support device and/or occlusion device retained by the retaining element about an axis of rotation, which is situated perpendicularly to an extension plane of the first support device and/or the occlusion device. This could have the advantage that a dental prosthesis arranged between the support device and the occlusion device can be rotated relative to the clamping element about the axis of rotation. In this way, access to the dental prosthesis from all sides for processing and/or examination purposes can be ensured. The rotatability can, for example, be implemented by using a retaining element in the form of an elastically mounted screw or using a pivot bearing. A corresponding pivot bearing can, for example, be used in addition to a retaining element or be used as a retaining element itself.

The clamping element comprises a first contact element, for example, which is configured to be introduced into a first recess in the second side of the first support device.

This could have the advantage, for example, that the first recess could limit movements of the contact element, in particular in an extension plane of the first support device or a plane perpendicular to a direction in which the first contact element is introduced into the first recess. Consequently, a displacement of the clamping element relative to the first support device could be prevented. For example, the pressure could be applied by the clamping element via the first contact element onto the first support device. In the process, the first contact element could be retained in the first recess by the pressure, whereby the first contact element could be prevented from detaching from the first connection. This could furthermore have the advantage that it is not necessary to expand the clamping device beyond the level of an edge of the recess for the contact element to be introduced into a recess.

The clamping element comprises a second contact element, for example, which is configured to be introduced into a second recess in the second side of the occlusion device.

This could have the advantage, for example, that the second recess could limit movements of the contact element, in particular in an extension plane of the second occlusion device or a plane perpendicular to a direction in which the second contact element is introduced into the second recess. Consequently, a displacement of the clamping element relative to the second occlusion device could be prevented. For example, the pressure could be applied by the clamping element via the second contact element onto the second occlusion device. In the process, the second contact element could be retained in the second recess by the pressure, whereby the second contact element could be prevented from detaching from the second connection. This could furthermore have the advantage that it is not necessary to expand the clamping device beyond the level of an edge of the recess for the contact element to be introduced into a recess.

The clamping element comprises a first rounded, such as hemispherical or spherical, contact element, for example, which is configured to be brought in contact with a first rounded, such as hemispherical, recess in the second side of the first support device. The clamping element comprises a second rounded, such as hemispherical or spherical, contact element, for example, which is configured to be introduced into a first rounded, such as hemispherical, recess in the second side of the occlusion device.

Using a hemispherical or spherical contact element or a ball adapter can have the advantage that a connection that is easy to establish and detach can be provided between the clamping element and the occlusion device and/or support device. This connection, for example, enables a rotation of the support device and/or occlusion device in contact with the hemispherical or spherical contact element about an axis of rotation. In the process, the spherical contact element enables, for example, a position-appropriate pressure behavior when the clamping element is being pivoted or rotated.

For example, the recess in the second side of the first support device is configured as a receptacle for the first spherical contact element of the clamping element. For example, the recess in the second side of the occlusion device is configured as a receptacle for the second spherical contact element of the clamping element.

For example, the occlusion device has a plurality of through-openings enabling access to one or more receptacles in the first gingiva for receiving the first teeth. This could have the advantage that access to the teeth arranged in the receptacle can be made possible. For example, access to an inner side of the teeth, such as lingual or palatal, is made possible. Via this access, it is possible, for example, to remove excess bonding agent, which is pushed out of a receptacle of the gingiva for the teeth, prior to curing. Furthermore, it is possible to work the corresponding teeth inner sides, if necessary.

For example, the one or more first support elements arranged at the first support device each comprise a support surface, which is configured to make contact in each case with a contact surface of an underside of the first prosthetic body located opposite the first gingiva, and the shape of which represents a negative imprint of the shape of the particular contact surface. For example, the shapes of the support surfaces in each case represent an impression of the shape of the contact surface with which these are to make contact. This could have the advantage that the support surfaces, serving as impressions of the particular contact surfaces, can enable a precisely fitting connection to the corresponding contact surface. The underside of the prosthetic body facing away from the artificial gingiva is, for example, adapted to the surface of the natural gingiva of a patient on which this is to be positioned. The underside of the prosthetic body has an irregular geometry, for example, so that the support surface only matches the associated contact surface, and consequently a relative alignment can be predefined between the support element and the gingiva of the dental prosthesis. For example, the underside of the prosthetic body corresponds to an impression of the natural gingiva of the patient, the surface geometry of which is detected using a scan process. The scan result is used to configure the underside of the prosthetic body. The scan result can likewise be used to configure the support surface. For example, the geometry of the support surface coincides with the scanned geometry of the natural gingiva of the patient.

For example, three or more of the first support elements, in the form of longitudinally extended support elements, are arranged at the first support device and configured for three-point or multi-point support of the first gingiva. This could have the advantage that, using point support, it is also possible to effectively support a surface area having an arbitrary geometry, even having a complex geometry. At least three points that are not arranged on a shared straight line are necessary for supporting a surface area having an arbitrary geometry in a stable manner. For example, three first support elements are arranged at the first support device, which provide three-point support of the first gingiva. Due to the minimal number of support points, such a three-point support can be efficiently implemented or adapted to the geometric circumstances of the gingiva to be supported. If more than three support points are used, the system is overdetermined. Nevertheless, in this way the stability of the support can possibly be further increased since the support is distributed over more support elements.

For example, each of the first support elements has a pin-shaped configuration. For example, the first support elements in each case taper toward a tip, which is configured to make contact with the underside of the first prosthetic body. The tip is flattened or rounded, for example. The tapering first support elements each have a conical or frustum-shaped configuration, for example. The tapering first support elements each have a rubber-coated or slip-resistant, for example coated, configuration, for example. A set of first support elements having differing lengths and/or shapes are provided for selection, for example, which can be combined with one another in different ways. From this set of first support elements, for example identical and/or differing support elements that fit an individual dental prosthesis can be selected and arranged at the support device to enable optimal support. For example, the support device provides a plurality of predefined attachment positions for the support elements, from which attachment positions suitable for the selected support elements can be selected. For example, the selection of the attachment forms can be carried out as a function of the selected support elements and/or the shape of the individual dental prosthesis.

For example, the first support elements are made of an elastically deformable material. This could have the advantage that the support elements do not need to be adapted to the gingiva to be supported in order to provide stable support. For example, neither the lengths, the shapes, in particular the shapes of the surfaces, or positions of the support elements would have to be adapted. Rather, the elastic material, and thus the particular support element itself, conform to the geometric circumstances of the prosthetic body to be supported. For example, the first support elements are connected to the support device in a not non-destructively detachable manner. For example, the first support elements are arranged at fixed positions on the first side of the first support device. If the support elements conform on their own, these neither have to be configured to be non-destructively detachable, nor does the position thereof have to be adapted. Consequently, the support device and the support elements can, for example, have a simpler configuration, and consequently be easier to produce and handle. For example, the support device is a generic support device, which is suitable for supporting different dental prostheses, in particular without individually adapting the support device to the corresponding dental prostheses. For example, the support device and the support elements are configured in one piece.

For example, a subset of the first support elements makes contact with the underside of the prosthetic body as part of the support process, while one or more of the first support elements do not make contact with the underside of the prosthetic body. For example, it depends on the prosthesis how many and which of the first support elements make contact with the underside of the prosthetic body as part of the support process. For example, the first support elements are arranged so as to be distributed on the first side of the first support device in such a way that, regardless of the prosthesis, at least three, four, five, six, seven, eight, nine, ten or more of the support elements make contact with the underside of the prosthetic body as part of the support process.

For example, the first support elements are composed of a stiff material, which is not elastically deformable or the elastic deformation of which is negligible. This could have the advantage that stable support can be provided for a gingiva of a dental prosthesis even using few support elements, such as one or two support elements having expansive support surfaces or three support elements for three-point support.

For example, all first support elements make contact with the underside of the first prosthetic body as part of the support process. For example, the first support elements are connected to the support device in a not non-destructively detachable manner. For example, the support elements are individually matched to the dental prosthesis to be supported, for example in terms of the length, shape and/or position of the support elements.

For example, one or more of the first support elements are each connected to the first support device in a non-destructively detachable manner. For example, the positions of the first support element can be changed non-destructively. The first support device is configured to predefine in each case, for example, a plurality of positions for each of the corresponding, that is, non-destructively detachably connected, first support elements, at which the corresponding support element can be connected to the first support device. This could have the advantage that the positions of the support elements can be individually adapted to the gingiva to be supported. Furthermore, the support elements can be replaced, depending on the geometry of the prosthetic bodies to be supported, and thus be individually adapted to the corresponding geometry. For example, support elements can be replaced with support elements having a different length, for example with shorter or longer support elements.

For example, the predefined positions for arranging the first support elements are defined by threaded boreholes in the first support device, into which the first support elements can be screwed by way of a screw thread.

For example, the lengths of the first support elements can be set, for example by means of a screw thread.

The first dental prosthesis is a partial denture or a full denture, for example.

The bonding auxiliary device comprises four components, for example. A first component, for example an occlusion device, comprises one or more first impressions of teeth or dental imprints on a first side, and one or more second impressions of teeth or dental imprints on a second side facing away from the first side. A second component, for example a first support device, comprises one or more first support elements. A third component, for example a second support device, comprises one or more second support elements. A fourth component, for example a clamping element, is configured to apply pressure, for example, onto the second and third components. The first component is configured, for example, to be arranged between the second and third components, so that it is also possible for pressure to be applied by the fourth component onto the first component, for example via the third component. For example, the four components can be arranged or are arranged in such a way that the pressure applied by the clamping element onto the two support devices is directed from two sides at the occlusion device or at the two groups of dental impressions of the occlusion device which face away from one another. For example, the two support devices and the occlusion device can be arranged or are arranged in such a way that the two groups of dental impressions of the occlusion device which face away from one another in each case face the support elements of one of the support devices while the pressure is being applied. The clamping element is configured, for example, to make contact with the two support devices for applying pressure, either directly or indirectly by way of intermediate components. For example, the clamping element is connected to the two support devices so as to be non-destructively detachable or not non-destructively detachable. For example, the clamping element is configured in one piece with the two support devices.

For example, the bonding auxiliary device is furthermore configured for arranging, aligning and fixing a plurality of second artificial teeth to be bonded into a second artificial gingiva of a second dental prosthesis. The first dental prosthesis is intended for a first jaw, and the second dental prosthesis is intended for a second jaw. The second jaw is an opposing jaw relative to the first jaw. The bonding auxiliary device comprises a second support device for supporting a second prosthetic body of the first dental prosthesis, including the second gingiva, comprising one or more second support elements, which are arranged on a first side of the second support device. On a second side facing away from the first side, the occlusion device comprises second impressions of dental crown upper sides of the second teeth according to the predefined occlusion, in which the dental crowns of the second teeth can be positioned for arrangement and alignment. The clamping element is configured to apply pressure onto the second side of the occlusion device via a second side of the second support device which faces away from the first side. The applied pressure furthermore serves to fix the second teeth, which are arranged and aligned by means of the occlusion device, in the second gingiva of the second prosthetic body that is supported by means of the second support device.

This could have the advantage that teeth in two dental prostheses, which are intended for the upper and lower jaws of the same patient, can be arranged, aligned and fixed simultaneously for bonding. In this case, the occlusion device is, for example, positioned between the two dental prostheses or between the teeth of the two dental prostheses and, on opposing sides, in each case provides impressions for arranging and aligning the teeth. The teeth are, for example, in each case arranged in receptacles in the upper sides of the gingivae, for example together with a bonding agent. On the outside, that is, on the undersides, the prosthetic bodies, including the gingivae, are in each case supported by a support device including support elements. The support elements arranged on the outside are in each case subjected by the clamping element with a pressure to be directed at the dental prostheses.

For example, the second support device can be configured analogously to each of the above-described examples of the first support device.

For example, the clamping element is configured to make contact, such as direct contact, with the second sides of the two support devices for applying the pressure.

For example, the clamping element comprises one or more elastic arcs that, for example, extend from the first support device to the second support device and have a spring constant that is configured to apply, by means of spring force, pressure onto the two support devices, from which result the predefined pressure that is applied onto the first support element and the occlusion device as well as onto the second support device and the occlusion device. The spring constant is, for example, a combination, such as a sum, of the spring constants of the individual arcs.

For example, the clamping element is configured in one piece together with the first support device and/or the second support device. This could have the advantage that the combination of the clamping element as well as the first and/or second support devices is easy to produce. For example, such a combination can be printed by means of a 3D printer or produced by means of a machining process, such as milling. For example, the clamping element is configured as one or more elastic arcs extending from the first and/or second support devices. The clamping element connects the first and second support devices, for example.

The clamping element is, for example, non-destructively attached on the second side of the first support device and/or on the second side of the second support device, using a retaining element.

This could have the advantage that the clamping element can be attached to the first and/or second support devices before the teeth are arranged in the gingivae, and the corresponding dental prostheses are arranged with the occlusion device between the support devices. The retaining element can prevent the attachment from being inadvertently detached as part of the introduction of the dental protheses. This can be advantageous when the clamping element, for introduction, is to be bent open using only two hands. Using one hand, the dental prostheses can be held with the occlusion device as well as the first and/or second support devices, while the clamping element, which is attached to the first and/or second support devices, is bent open using the other hand.

For example, the retaining element is a screw. The retaining element is, for example, an element of a known, preferably non-destructively detachable connection type, such as a plug connection, a clamping connection, a detent connection, or a bayonet catch, and the like. The retaining element is, for example, arranged at the center of the first and/or second support devices. For example, the retaining element is mounted by way of an elastic element, such as a rubber buffer or a spring element, through which the retaining element, for example in the form of a screw, extends. The elastic mount makes it possible, for example, to achieve compensation when using support elements having differing lengths, or in the case of differing dimensions of the dental prostheses, for example differing alveolar crest conditions of the prosthetic body or of the artificial gingivae.

For example, the retaining element is configured to enable a one-dimensional elastic lateral displacement of the second support device relative to the retaining element. For example, the one-dimensional elastic lateral displacement takes place along a displacement axis, which is situated perpendicularly to an extension plane of the second support device.

For example, the retaining element is configured to enable a rotation of the second support device retained by the retaining element about an axis of rotation, which is situated perpendicularly to an extension plane of the second support device. This could have the advantage that a dental prosthesis arranged between the support devices can be rotated relative to the clamping element about the axis of rotation. In this way, access to the dental prostheses from all sides for processing and/or inspection purposes can be ensured. The rotatability can, for example, be implemented by using a retaining element in the form of an elastically mounted screw or using a pivot bearing. A corresponding pivot bearing can, for example, be used in addition to a retaining element or be used as a retaining element itself.

The clamping element comprises a first spherical contact element, for example, which is configured to make contact with a hemispherical recess in the second side of the first support device, and/or comprises a second spherical contact element, which is configured to make contact with a hemispherical recess in the second side of the second support device.

Using a spherical contact element or a ball adapter can have the advantage that a connection that is easy to establish and detach can be provided between the clamping element of the first and/or second support devices. This connection, for example, enables a rotation of the first and/or second support devices, which are in contact with the spherical contact element, about an axis of rotation. In the process, the spherical contact element enables, for example, a position-appropriate pressure behavior when the clamping element is being pivoted or rotated.

For example, the recess in the second side of the second support device is configured as a receptacle for the second spherical contact element of the clamping element.

The second dental prosthesis is a partial denture or a full denture, for example.

The occlusion device is configured, for example, as a double element, such as a double plate, comprising two occlusion elements, such as plate elements, arranged parallel to one another. The first side of the occlusion device is a side of the first occlusion element which faces away from the second occlusion element. The second side of the occlusion device is a side of the second occlusion element which faces away from the first occlusion element. The two occlusion elements are spaced apart from one another by spacer elements and in each case have a plurality of through-openings enabling access to one or more receptacles in the first gingiva for receiving the first teeth, and to one or more receptacles in the second gingiva for receiving the second teeth.

This could have the advantage that access to the teeth arranged in the receptacles can be made possible. For example, access to an inner side of the teeth, such as lingual or palatal, of the two dental protheses is made possible. Via this access, it is possible, for example, to remove excess bonding agent, which is pushed out of a receptacle of the gingivae for the teeth, prior to curing. Furthermore, it is possible to work the corresponding teeth inner sides, if necessary.

For example, the spacer elements have a pillar-shaped configuration and extend between the mutually facing sides of the two plate elements. For example, the spacer elements are arranged along the circumference of the plate elements. For example, one or more spacer elements are arranged at the center of the plate elements. For example, proceeding from the center of the plate elements, spacer elements are in each case arranged on radial lines, up to an edge of the plate elements. This could have the advantage that the distance between the plate elements can be effectively stabilized, while also providing access between the spacer elements to the through-openings in the plate elements, and thus to the teeth arranged in the dental prostheses.

For example, the occlusion device, the first support device, the second support device and/or the clamping element are each printed by way of a 3D printer. For example, the occlusion device, the first support device, the second support device and/or the clamping element are each partially and/or completely printed by way of a 3D printer.

For example, the occlusion device, the first support device, the second support device and/or the clamping element are each partially and/or completely produced by means of a machining process.

For example, a system is provided which comprises a bonding auxiliary device according to one of the above-described examples of the bonding auxiliary device and a first dental prosthesis comprising a plurality of first artificial teeth to be bonded into a first artificial gingiva of a first prosthetic body of the first dental prosthesis.

For example, the first teeth, the first prosthetic body and/or the first gingiva are each printed by way of a 3D printer. For example, the first teeth, the first prosthetic body and/or the first gingiva are each produced by means of a machining process.

The system furthermore comprises, for example, a second dental prosthesis comprising a plurality of second artificial teeth to be bonded into a second artificial gingiva of a second prosthetic body of the second dental prosthesis.

For example, the second teeth, the second prosthetic body and/or the second gingiva are each printed by way of a 3D printer. For example, the second teeth, the second prosthetic body and/or the second gingiva are each produced by means of a machining process For example, a method for producing an occlusion device for a bonding auxiliary device, using a computer system, is provided.

The method comprises, for example:
providing a three-dimensional computer model of a dental pattern;
providing a generic three-dimensional computer model of an occlusion device;
generating dental impressions in the three-dimensional computer model of the occlusion device, using the computer model of the dental pattern; and
producing an occlusion device, using the three-dimensional computer model of the occlusion device including the dental impressions.

The method comprises, for example:
providing a three-dimensional computer model of a first dental prosthesis to be produced, wherein the first dental prosthesis comprises a plurality of first artificial teeth having a predefined occlusion, which are arranged in a first artificial gingiva of a first prosthetic body;
providing a generic three-dimensional computer model of an occlusion device;
generating first impressions of dental crown upper sides of the first teeth in a first side of the three-dimensional computer model of the occlusion device in which the dental crowns of the first teeth can be positioned for arrangement and alignment; and
producing the occlusion device, using the three-dimensional computer model of the occlusion device including the first impressions of the dental crown upper sides of the first teeth.

This could have the advantage that the dental prosthesis to be produced can be planned, using a computer, and the resulting computer model can be used to generate a model of the impressions of the dental crown upper sides of the teeth, that is, the occlusal surfaces of the teeth, in the occlusion device. In this way, a precise fit of the teeth in the impressions with the occlusal surfaces can be ensured, which not only allows the teeth to be precisely arranged and aligned in the occlusion device, but additionally provides sufficient retention for the teeth at the occlusion device. Such a retention allows the risk of the teeth being undesirably displaced as part of an introduction into receptacles of the artificial gingiva or of the prosthetic body or an arrangement of the clamping element for the application of pressure to be avoided. The occlusion device can, for example, be printed by means of a 3D printer or produced by means of a machining process. For this purpose, the computer model created and/or processed using the computer system, such as in the form of a CAD file, can be transmitted to a CAM device, such as a 3D printer or a milling device, which automatically produces the occlusion device according to the model specifications.

For example, the first impressions are generated in the three-dimensional computer model of the occlusion device by copying the dental crown upper sides of the first teeth from the three-dimensional computer model of the occlusion device.

The method comprises, for example:
providing a generic three-dimensional computer model of a first support device for supporting a first prosthetic body of the first dental prosthesis, including the first gingiva, comprising one or more first support elements, which are arranged on a first side of the first support device, wherein the one or more first support elements arranged at the first support device in each case comprise a support surface, which is intended to make contact in each case with a contact surface of an underside of the first prosthetic body located opposite the first gingiva;
adapting shapes of support surfaces so that the shapes in each case represent a negative imprint of the shape of the particular contact surface; and
producing the first support device, using the three-dimensional computer model of the first support device including adapted support surfaces.

This could have the advantage that the dental prosthesis to be produced can be planned, using a computer, and the resulting computer model can be used to generate a model of the support element or elements of the support device, and in particular of the support surfaces. In this way, a precise fit seat of the support elements or of the support surfaces at the underside of the prosthetic body or of the contact surfaces can be ensured. For constructing the underside of the prosthetic body located opposite the artificial gingiva, data of a scan of the surface of the natural gingiva of the patient for whom the dental prosthesis is to be produced can be used, for example.

For example, the underside of the prosthetic body represents an impression, that is, a negative imprint, of the surface of the natural gingiva of the patient, so that a precise fit seat of the dental prosthesis on the natural gingiva can be ensured. The shape of the surface of the natural gingiva can then, for example, be used as the shape for the support surface. As an alternative, the artificial gingiva or the underside of the prosthetic body located opposite the artificial gingiva can be copied from the support element. The support device can, for example, be printed by means of a 3D printer or produced by means of a machining process. For this purpose, the computer model created and/or processed using the computer system, such as in the form of a CAD file, can be transmitted to a CAM device, such as a 3D printer or a milling device, which automatically produces the support device according to the model specifications.

The method comprises, for example:
providing a three-dimensional computer model of a generic clamping element, which is configured to apply pressure onto a second side of the occlusion device facing away from the first side, and onto a second side of the first support device facing away from the first side, for fixing the first teeth, which are arranged and aligned by means of the occlusion device, in the first gingiva of the first prosthetic body that is supported by means of the first support device, wherein the clamping element comprises one or more elastic arcs;
determining a spring constant for the one or more arcs with which the predefined pressure is applied onto the occlusion device and the first support device when the first dental prosthesis is arranged between the occlusion device and the first support device;
adapting the material thickness of the one or more arcs of the three-dimensional computer model so that the one or more arcs have the determined spring constant; and
producing the clamping element, using the three-dimensional computer model of the one or more arcs with the adapted material thickness.

This could have the advantage that, proceeding from a generic model, a prosthesis-specific computer model of a clamping element having one or more adapted arcs is generated. In this way, it can be ensured that the clamping element is suitable for applying a predefined pressure onto the dental prosthesis. The clamping element can, for example, be printed by means of a 3D printer or produced by means of a machining process. For this purpose, the computer model created and/or processed using the computer system, such as in the form of a CAD file, can be transmitted to a CAM device, such as a 3D printer or a milling device, which automatically produces the clamping element according to the model specifications. The one or more elastic arcs of the generic clamping element extend, for example, from the first support device to the occlusion device. The spring constant is, for example, a combination, such as a sum, of the spring constants of the individual arcs.

For example, the first teeth, the first prosthetic body and/or the first gingiva are furthermore produced, using the three-dimensional computer model of the first dental prosthesis. This could have the advantage that the model of the dental prosthesis can furthermore be used to produce the elements of the dental prosthesis, that is, of the teeth, the first prosthetic body and/or the gingiva. The teeth, the first prosthetic body and/or the gingiva can, for example, be printed by means of a 3D printer or be produced by means of a machining process. For this purpose, the computer model created and/or processed using the computer system, such as in the form of a CAD file, can be transmitted to a CAM device, such as a 3D printer or a milling device, which automatically produces the teeth, the first prosthetic body and/or the gingiva according to the model specifications.

The method comprises, for example:
providing a three-dimensional computer model of a second dental prosthesis to be produced, wherein the second dental prosthesis comprises a plurality of second artificial teeth having a predefined occlusion, which are arranged in a second artificial gingiva of a second prosthetic body; and
generating second impressions of dental crown upper sides of the second teeth in a second side of the three-dimensional computer model of the occlusion device facing away from the first side, in which the dental crowns of the second teeth can be positioned for arrangement and alignment,
wherein, for producing the occlusion device, the three-dimensional computer model of the occlusion device, including the first and second impressions of the dental crown upper side of the first and second teeth, is used.

This could have the advantage that an occlusion device can be produced, which is configured to provide retention not only for the teeth for one dental prosthesis, but for two dental prostheses, as part of a precise bonding process. The occlusion device, including the impressions arranged on both sides, allows teeth to be precisely arranged and aligned on both sides of the occlusion device arranged between the teeth or dental prostheses. For example, the second impressions are generated in the three-dimensional computer model of the occlusion device by copying the dental crown upper sides of the second teeth from the three-dimensional computer model of the occlusion device.

The method comprises, for example:

providing a generic three-dimensional computer model of a second support device for supporting a first prosthetic body of the first dental prosthesis, comprising the second gingiva, including one or more second support elements, which are arranged on a first side of the second support device, wherein the one or more second support elements arranged at the second support device in each case comprise a support surface, which is intended to make contact in each case with a contact surface of an underside of the second prosthetic body located opposite the second gingiva;

adapting shapes of support surfaces so that the shapes in each case represent a negative imprint of the shape of the particular contact surface; and producing the second support device, using the three-dimensional computer model of the second support device with adapted support surfaces.

This could have the advantage that the second dental prosthesis to be produced can be planned, using a computer, and the resulting computer model can be used to generate a model of the support element or elements of the support device, and in particular of the support surfaces. In this way, a precise fit seat of the support elements or of the support surfaces at the underside of the prosthetic body or of the contact surfaces can be ensured. For constructing the underside of the prosthetic body, data of a scan of the surface of the natural gingiva of the patient for whom the second dental prosthesis is to be produced can be used, for example.

For example, the underside of the prosthetic body represents an impression, that is, a negative imprint, of the surface of the natural gingiva of the patient, so that a precise fit of the second dental prosthesis on the natural gingiva can be ensured. The shape of the surface of the natural gingiva can then, for example, be used as the shape for the support surface. As an alternative, the artificial gingiva or the underside of the prosthetic body located opposite the artificial gingiva can be copied from the support element. The support device can, for example, be printed by means of a 3D printer or produced by means of a machining process. For this purpose, the computer model created and/or processed using the computer system, such as in the form of a CAD file, can be transmitted to a CAM device, such as a 3D printer or a milling device, which automatically produces the support device according to the model specifications.

For example, the clamping element according to the three-dimensional computer model of the generic clamping element is configured to apply pressure onto a second side of the first support device facing away from the first side, and onto a second side of the second support device facing away from the first side, for fixing the second teeth, which are arranged and aligned by means of the occlusion device, in the second gingiva of the second prosthetic body that is supported by means of the second support device. The one or more elastic arcs extend, for example, from the first support device to the second support device. The spring constant is determined for the one or more arcs, with which the predefined pressure is applied onto the first and second support devices when the first and second dental prostheses are arranged between the first and second support devices. The spring constant is, for example, a combination, such as a sum, of the spring constants of the individual arcs. The material thickness of the one or more arcs of the three-dimensional computer model is adapted so that the one or more arcs have the determined spring constant. The clamping element is produced, using the three-dimensional computer model of the one or more arcs with the adapted material thickness.

This could have the advantage that, proceeding from a generic model, a prosthesis-specific computer model of a clamping element having one or more adapted arcs is generated. In this way, it can be ensured that the clamping element is suitable for applying a predefined pressure onto the two dental prostheses. The clamping element can, for example, be printed by means of a 3D printer or produced by means of a machining process. For this purpose, the computer model created and/or processed using the computer system, such as in the form of a CAD file, can be transmitted to a CAM device, such as a 3D printer or a milling device, which automatically produces the clamping element according to the model specifications.

For example, the second teeth, the second prosthetic body and/or the second gingiva are furthermore produced, using the three-dimensional computer model of the second dental prosthesis. This could have the advantage that the model of the dental prosthesis can furthermore be used to produce the elements of the dental prosthesis, that is, the teeth, the second prosthetic body and/or the gingiva. The teeth, the second prosthetic body and/or the gingiva can, for example, be printed by means of a 3D printer or be produced by means of a machining process. For this purpose, the computer model created and/or processed using the computer system, such as in the form of a CAD file, can be transmitted to a CAM device, such as a 3D printer or a milling device, which automatically produces the teeth, the second prosthetic body and/or the gingiva according to the model specifications.

For example, a method for using a bonding auxiliary device for bonding a plurality of first teeth into a first artificial gingiva is provided. The bonding auxiliary device comprises an occlusion device for arranging and aligning the first teeth relative to one another according to a predefined occlusion, a first support device for supporting a first prosthetic body of the first dental prosthesis, comprising the first gingiva, including one or more first support elements, which are arranged on a first side of the first support device, and a clamping element for fixing the first teeth, which are arranged and aligned by means of the occlusion device, in the first gingiva.

On a first side, the occlusion device comprises first impressions of dental crown upper sides of the first teeth according to the predefined occlusion, in which the dental crowns of the first teeth can be positioned for arrangement and alignment. The clamping element is configured to apply pressure onto a second side of the occlusion device facing away from the first side, and onto a second side of the first support device facing away from the first side, for fixing the first teeth, which are arranged and aligned by means of the occlusion device, in the first gingiva of the first prosthetic body that is supported by means of the first support device.

The method comprises:

arranging and aligning the first teeth in the occlusion device, wherein the dental crowns of the first teeth are positioned in the first impressions of the occlusion device;

introducing a bonding agent into the first gingiva;
introducing the first teeth into the first gingiva;
fixing the first teeth in the first gingiva, wherein the underside of the first prosthetic body is supported by the first support device and, using the clamping element, pressure is applied onto the second side of the occlusion device and onto the second side of the first support device;
curing the bonding agent; and
removing the bonding auxiliary device.

This could have the advantage that it can be ensured, using the bonding auxiliary device, that teeth are bonded at precisely defined positions having precisely defined alignments. In the process, the positions and alignments of the teeth, in particular also the relative heights with respect to one another, are predefined by the occlusion device. Moreover, the occlusion device offers sufficient retention to the teeth, so that inadvertent displacement of the teeth as part of the introduction into the gingiva can be avoided.

Using the clamping element, the teeth can be fixed during the curing process, so that displacements can be avoided. The clamping element can apply a predefined pressure, which can ensure that the bonding agent is uniformly distributed between the teeth and the gingiva. Prior to curing, the fit of the teeth in the gingiva can be checked. Moreover, bonding agent that, as part of the application of the pressure, was pushed out of the spaces between the teeth and the gingiva can be removed prior to curing, for example. This allows more bonding agent than is in fact necessary to be introduced between the teeth and the gingiva. As a result, uniform and complete distribution of the bonding agent can be ensured, without gaps remaining between the teeth and the gingiva, which could later impair the stability of the teeth. Excess bonding agent can be easily removed.

The method is configured, for example, to use each of the above-described examples of the bonding auxiliary device.

For example, the bonding auxiliary device is furthermore configured for arranging, aligning and fixing a plurality of second artificial teeth to be bonded into a second artificial gingiva of a second dental prosthesis. The first dental prosthesis is intended for a first jaw, and the second dental prosthesis is intended for a second jaw. The second jaw is an opposing jaw relative to the first jaw. The bonding auxiliary device comprises a second support device for supporting a second prosthetic body of the second dental prosthesis, comprising the second gingiva, including one or more second support elements, which are arranged on a first side of the second support device. On a second side facing away from the first side, the occlusion device comprises second impressions of dental crown upper sides of the second teeth according to the predefined occlusion, in which the dental crowns of the second teeth can be positioned for arrangement and alignment. The clamping element is configured to apply pressure onto the second side of the occlusion device via a second side of the second support device which faces away from the first side. The applied pressure furthermore serves to fix the second teeth, which are arranged and aligned by means of the occlusion device, in the second gingiva of the second prosthetic body that is supported by means of the second support device.

The method furthermore comprises:
arranging and aligning the second teeth in the occlusion device, wherein the dental crowns of the second teeth are positioned in the second impressions of the occlusion device;
introducing a bonding agent into the second gingiva;
introducing the second teeth into the second gingiva; and
fixing the second teeth in the second gingiva, wherein an underside of a second prosthetic body is supported by the second support device and, using the clamping element, pressure is applied onto the second side of the second support device so that the pressure is applied onto the second side of the occlusion device via the second support device and the second dental prosthesis.

This could have the advantage that it can be ensured, using the bonding auxiliary device, for two dental prostheses at a time that teeth are bonded at precisely defined positions having precisely defined alignments. In the process, the positions and alignments of the teeth, in particular also the relative heights with respect to one another, are predefined by the occlusion device. Moreover, the occlusion device offers sufficient retention to the teeth of both dental prostheses, so that inadvertent displacement of the teeth as part of the introduction into the gingiva can be avoided. Using the clamping element, the teeth of both dental prostheses can be fixed during the curing process, so that displacements can be avoided. The clamping element can apply a predefined pressure onto both dental prostheses, which can ensure that the bonding agent is uniformly distributed between the teeth and the gingiva.

Ordinal numbers such as "first," "second," "third" and the like are primarily used herein to distinguish different elements denoted by the same reference numeral, and do not necessarily establish precedence or chronological sequence.

Examples will be described in more detail hereafter with reference to the drawings. In the drawings.

Elements of the following examples that correspond to each other are denoted by the same reference numerals.

Figure 1:
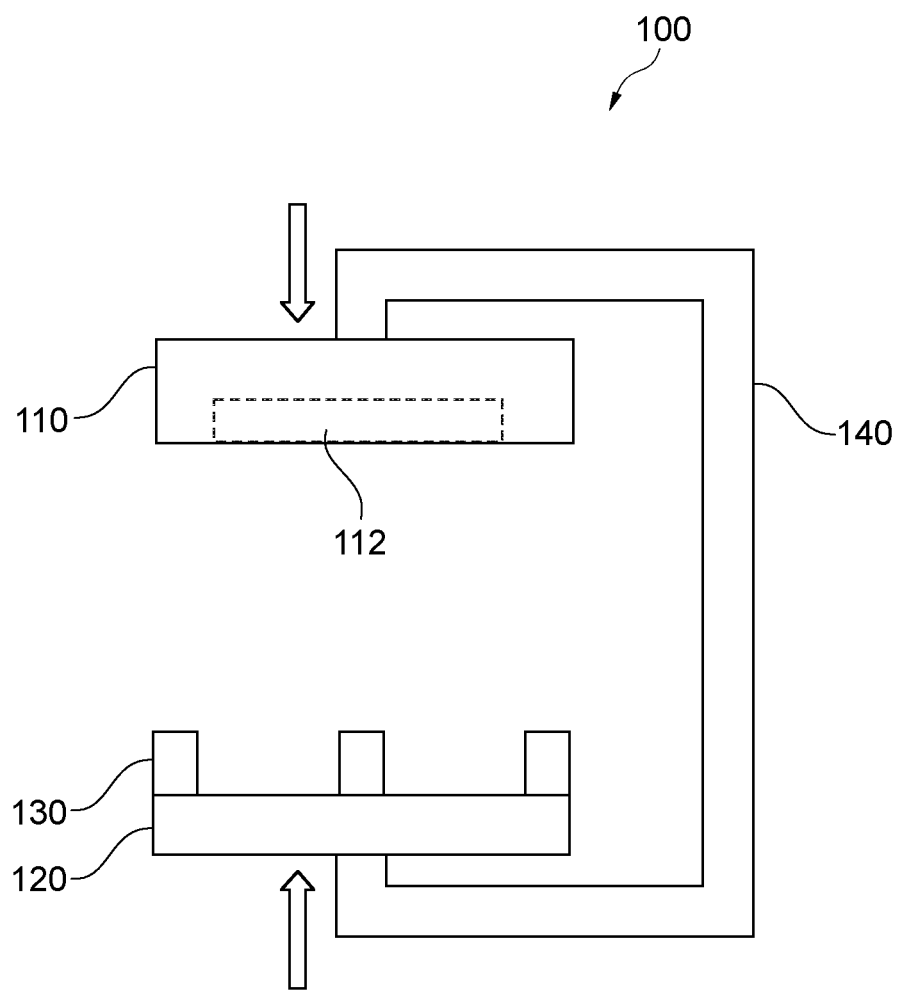
FIG. 1 shows an exemplary bonding auxiliary device.

FIG. 1 shows a schematic view of an exemplary bonding auxiliary device 100. The bonding auxiliary device 100 comprises at least three components 110, 120, 140, for example. A first of the components 110, this being an occlusion device, comprises one or more impressions 112 of teeth. A second of the components 120, this being a support device, comprises one or more support elements 130. A third component 140, this being a clamping element, is configured to apply pressure onto the first and second components 110, 120. The three components 110, 120, 140 are arranged in such a way, for example, that the pressure applied by the clamping element 140 onto the support device 120, the direction of which is indicated by the lower arrow in FIG. 1, is directed toward the dental impressions 112 of the occlusion device 110. The pressure applied by the clamping element 140 onto the occlusion device 110, the direction of which is indicated by the upper arrow in FIG. 1, is directed toward the support elements 130 of the support device 120, for example. The support device 120 and the occlusion device 110 are arranged in such a way, for example, that, while the pressure is being applied, the dental impressions 112 of the occlusion device 140 face the support elements 130 of the support device 120. The clamping element 140 is configured, for example, to make contact with the occlusion device 110 and the support device 130 for applying pressure, either directly or indirectly by way of intermediate components. For example, the clamping element 140 is connected to the occlusion device 110 and/or the support device 120 so as to be non-destructively detachable or not non-destructively detachable. For example, the clamping element 140 is configured in one piece with the occlusion device 110 and/or the support device 120.

Figure 2A:
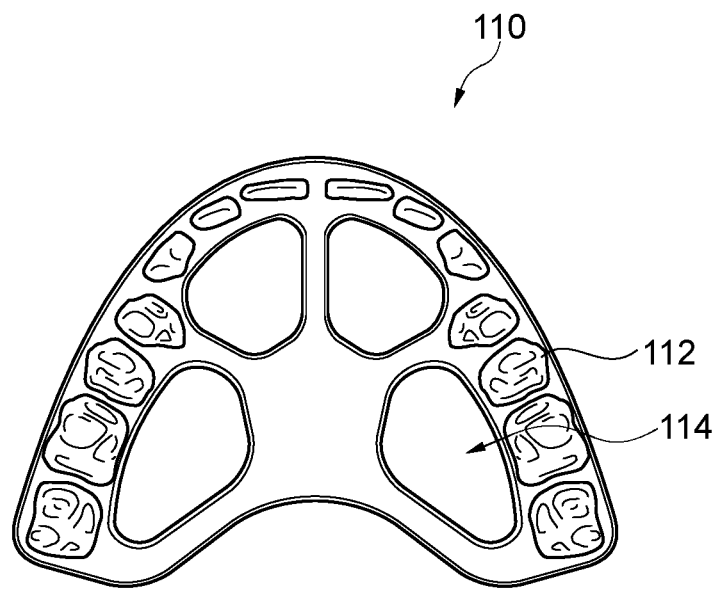
FIG. 2 shows an exemplary occlusion device.
Figure 2B:
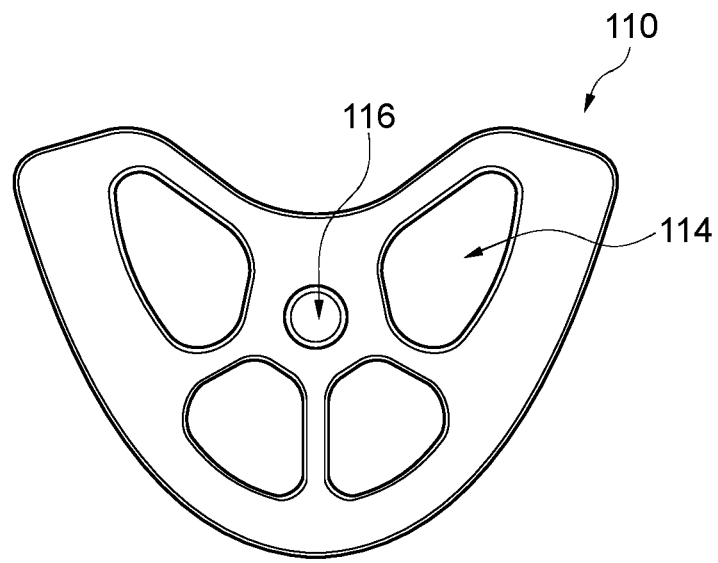

FIGS. 2A and 2B show an exemplary occlusion device 110. The occlusion device 110 comprises a plurality of impressions 112 of dental crown upper sides of teeth, which can be positioned for a precise arrangement and alignment in the impressions 112. The impressions 112 can furthermore be configured to offer retention to the dental crowns of the teeth when these have been introduced into the impressions 112. The occlusion device 110 furthermore includes a plurality of through-openings 114, which can provide access to the teeth arranged in the impressions 112. Via the through-openings 114, it is possible to check the fit of the teeth in the impressions 112 and/or in a gingiva into which the teeth are to be bonded. Furthermore, a distribution of a bonding agent between the teeth and the gingiva can be checked, and excess bonding agent can be removed prior to curing. For example, missing bonding agent can be added.

FIG. 2A shows a perspective view of a first side of the occlusion device 110, which comprises the impressions 112. FIG. 2B shows a perspective view of a second side of the occlusion device 110 which faces away from the first side. This second side, for example, makes contact with a clamping element for applying pressure onto the occlusion device 110. For this purpose, the second side of the occlusion device 110 includes, for example, a hemispherical recess 116 for receiving a spherical contact element of the clamping element. Other forms of a non-destructive connection are likewise possible, for example. If the occlusion device 110 is configured for the arrangement and alignment of teeth of two dental prostheses, the second side of the occlusion device 110 facing away from the first side can be configured as is likewise shown, for example, in FIG. 2A, including a plurality of second impressions of dental crown upper sides of the teeth of the second dental prothesis, similarly to the impressions 112 that can be positioned for a precise arrangement and alignment in the second impressions.

Figure 3A:
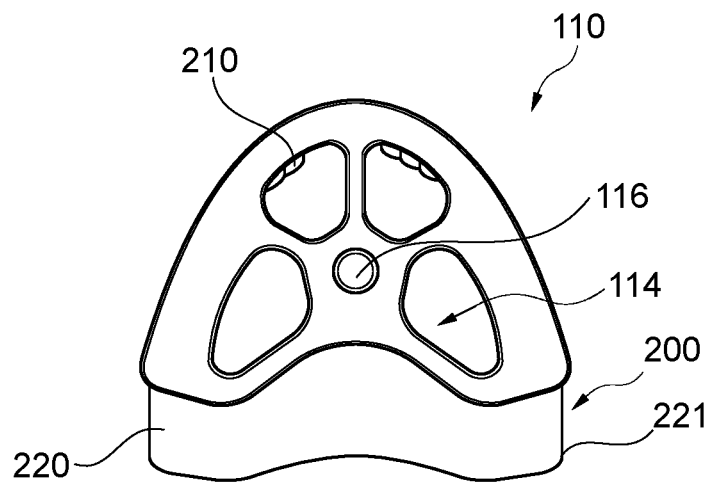
FIG. 3 show an exemplary occlusion device in conjunction with an exemplary dental prosthesis.
Figure 3B:
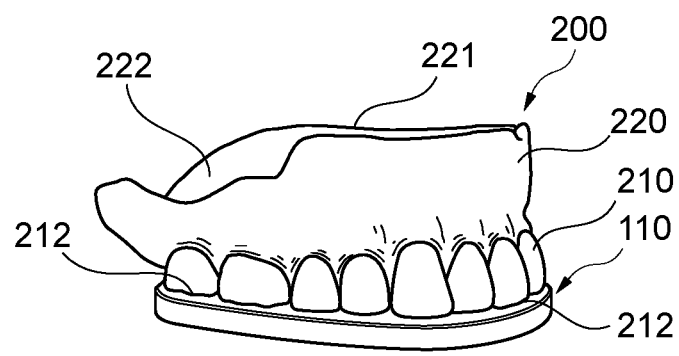
Figure 3C:
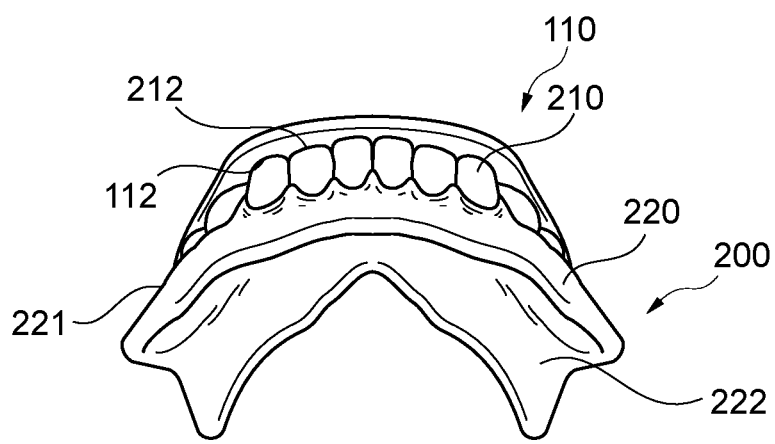

FIGS. 3A to 3C show the exemplary occlusion device from FIGS. 2A and 2B in conjunction with an exemplary dental prosthesis 200, which comprises teeth 210 and a prosthetic body 221 including an artificial gingiva 220. The crowns 212 of the teeth 210 are positioned in the impressions 112, for example. The teeth 210 thus positioned are introduced into the gingiva 220 of the prosthetic body 221 for bonding. FIG. 3A shows a perspective view of the second side of the occlusion device 110 including the dental prosthesis 200 arranged therebeneath, FIG. 3B shows a side view of the occlusion device 110 including the dental prosthesis 200, and FIG. 3C shows a perspective view of the combination of the occlusion device 110 and the dental prosthesis 200 from the side of the dental prosthesis 200.

Figure 4A:
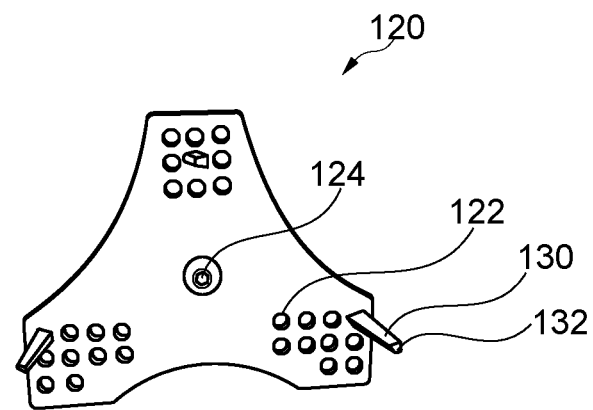
FIG. 4 show an exemplary support device comprising support elements.
Figure 4B:
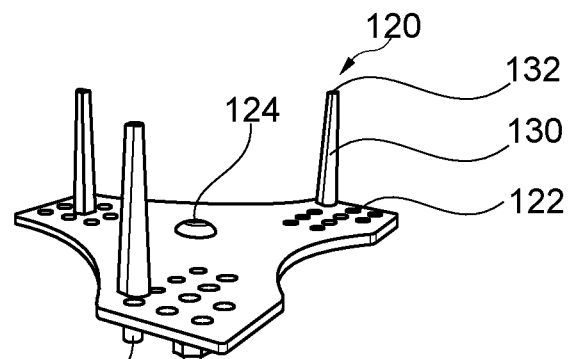
Figure 4C:
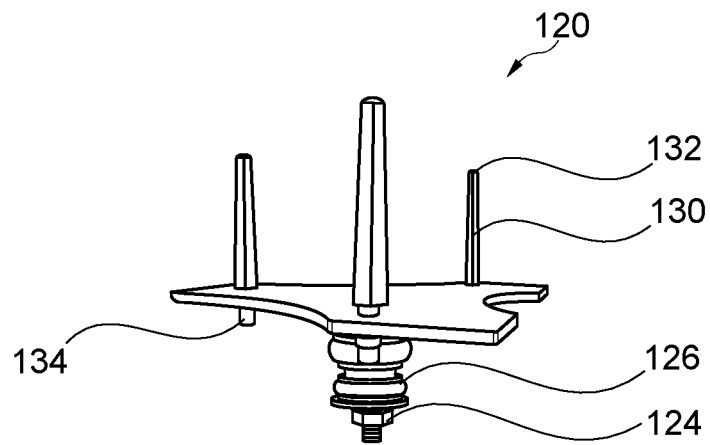

FIGS. 4A to 4C show an exemplary support device 120 comprising support elements 130 for supporting a prosthetic body of a dental prosthesis, which comprises a gingiva. The pin-shaped support elements 130 taper, for example, proceeding from the support device 120, toward a, for example flattened, tip 132. For example, the tapering support elements each have a rubber-coated or slip-resistant, for example coated, configuration and/or are kept available in differing lengths. The tips 132 are configured for a point support on an underside of the prosthetic body located opposite the gingiva. The present example shows three support elements 130 by way of example, which enable a three-point support of the prosthetic body including the gingiva. For example, two of the support elements 130 are provided for supporting the prosthetic body in the molar area, and one support element 130 is provided for supporting the prosthetic body in the labial area. The support device 120 furthermore comprises a plurality of position boreholes 122, for example, into which the support elements 130 can be screwed by way of a screw thread 134. The support elements 130 could, for example, also be inserted into dowel pin receptacles having a clamping action, and retained thereby. The support elements 130 are thus connected to the support device 120 in a non-destructively detachable manner. Changing the position boreholes 122 into which the support elements 130 are screwed or inserted allows the positions of the support element 130 to be individually adapted to the underside geometry of the prosthetic body to be supported, including the gingiva. Furthermore, an additional adaptation to the underside geometry of the prosthetic body to be supported can be carried out by selecting support elements 130 having a suitable length. A fine adjustment of the lengths of the support elements 130 can, for example, be carried out by means of the screw thread 134 and/or by selecting support elements 130 having differing lengths.

The support device 120 furthermore includes a, for example central, borehole for receiving a retaining element 124, for example in the form of a screw. The retaining element 124 could, for example, also be an element of another known, preferably non-destructively detachable, connection type, such as a plug connection, a clamping connection, a detent connection, or a bayonet catch, and the like. The retaining element 124 is configured for a nondestructively detachable attachment of a clamping element to the support device 120. For example, the retaining element 124 is elastically mounted, using an elastic element 126, such as a rubber buffer or spring element. The elastic element 126 allows, for example, the support device 120 to rotate about a longitudinal axis of the retaining element 124, serving as the axis of rotation. Such a rotation can, for example, facilitate access to a dental prosthesis supported by the support device 120 from different directions. Furthermore, the elastic element 126 can enable a lateral displacement of the support device 120 along the longitudinal axis of the retaining element 124. Such a lateral displacement can, for example, compensate for differing dimensions of the supported dental prostheses. FIG. 4A shows a top view onto a first side of the support device 120, at which the support elements 130 for supporting the gingiva are arranged, FIG. 4B shows a perspective view of the first side of the support device 120, and FIG. 4C shows a side view of the support device 120.

Figure 5A:
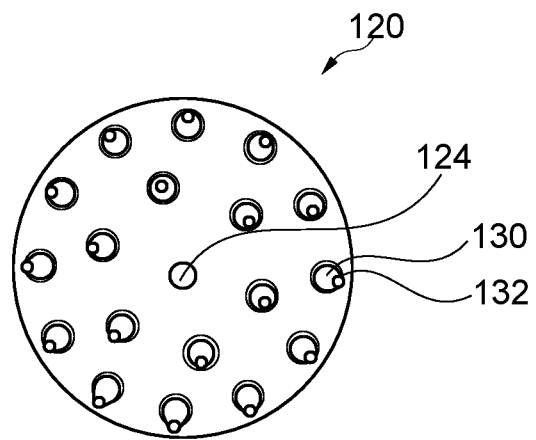
FIG. 5 show an exemplary support device comprising support elements.
Figure 5B:
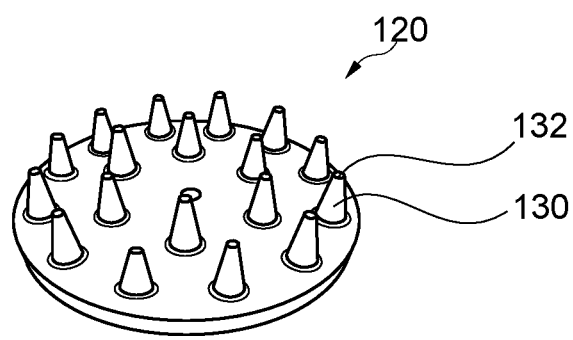
Figure 5C:
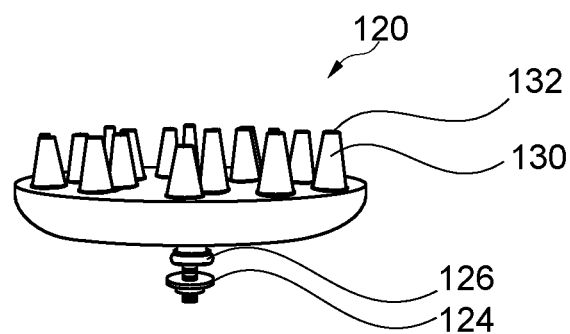

FIGS. 5A to 5C show another exemplary support device 120 comprising support elements 130 for supporting a prosthetic body of a dental prosthesis, which comprises a gingiva. The conical support elements 130 taper, proceeding from the support device 120, toward a, for example flattened, tip 132. The support elements 130 are made, for example, of an elastic material, such as silicone, and conform, for example, to the underside geometry of the prosthetic body to be supported. Consequently, no adjustment of the lengths of the support elements 130 to the dental prosthesis to be supported is necessary, for example, since the support elements 130 elastically conform on their own. The support elements 130 cannot, for example, be non-destructively detached from the support device 120, that is, the positions of the support elements 130 cannot be individually adapted to the dental prosthesis to be supported. For this purpose, the support device 120 can, for example, comprise a plurality of support elements 130 which is greater than the number of support elements 130 necessary for supporting a dental prosthesis in a stable manner. These support elements 130 are distributed across the lateral surface of the support device 120, for example uniformly or not uniformly, so that it can be ensured that a sufficient number of support elements 130 is available at all times for supporting a prosthetic body. During the support process, it is thus not necessarily all, but only a few of the provided support elements 130, for example, that make contact with the underside of the prosthetic body to be supported. In FIGS. 5, the support device 120, as the support device 120 before in FIGS. 4, furthermore comprises a retaining element 124, for example in the form of a screw, including an elastic element, such as a rubber buffer or a spring element, for attaching the support device 120 to a clamping element. The retaining element 124 could, for example, also be an element of another known, preferably non-destructively detachable, connection type, such as a plug connection, a clamping connection, a detent connection, or a bayonet catch, and the like. FIG. 5A shows a top view onto a first side of the support device 120, at which the support elements 130 for supporting the gingiva are arranged, FIG. 5B shows a perspective view of the first side of the support device 120, and FIG. 5C shows a side view of the support device 120.

Figure 6:
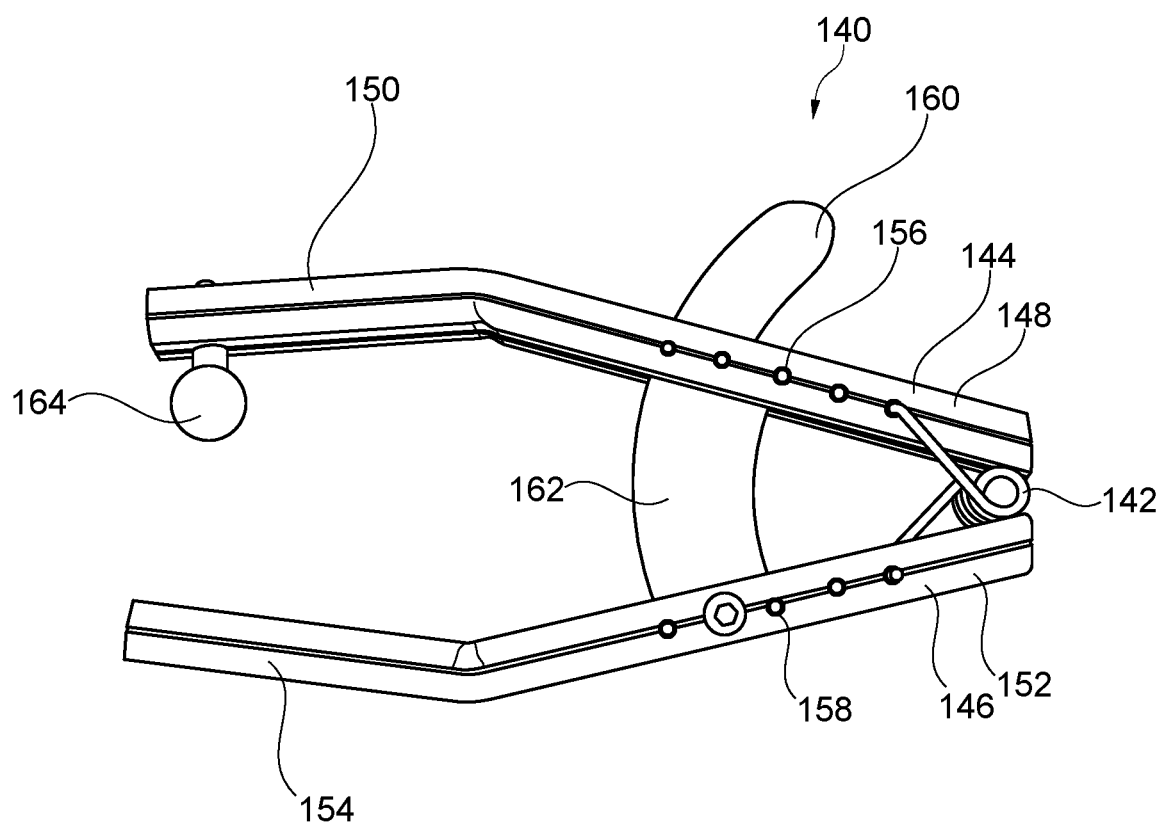
FIG. 6 shows an exemplary clamping element.

FIG. 6 shows an exemplary clamping element 140. The clamping element 140 comprises two legs 144, 146, for example, which are connected to one another, using a spring 142. The spring 142 is a torsion spring, for example, which is configured as a joint between the two legs 144, 146, so that the two legs 144, 146 can be pivoted relative to one another about the spring 142, serving as the pivot axis. The two legs 144, 146 each comprise two sections 148, 150 and 152, 154, for example. The sections 148, 150 and 152, 154 are each straight sections, for example, but could also be curved. In a starting position of the clamping element, for example, the two first sections 148, 152 of the two legs 144, 146 extend parallel to one another and are intended to apply pressure that is generated by the spring force of the spring 142 onto a dental prosthesis, for example by way of an occlusion device and/or a support device. The first sections 148, 152 of the two legs 144, 146 in each case form a flat angle with a second section 154, 156, for example. The second sections 154, 156 are arranged so as to be inclined toward one another, for example, and are connected to one another by the spring 142. The clamping element 140 furthermore comprises a circular arc-shaped guide element 160, which is attached to a first of the legs 146 and extends through a through-opening of the second leg 144, so that the second leg 144, when pivoting about the spring 142 serving as the pivot axis, is guided relative to the first leg 146 and stabilized.

The guide element 160 furthermore comprises a section that acts as a limiting element 162 and that, in the rest position, extends between the two legs 144, 146 and has a diameter that is greater than a diameter of the through-borehole of the second leg 144, and consequently limits the first section 150 of the second leg 144 approaching the first section 154 of the first leg 146. Finally, the first section 150 of the second leg 144, at a distal end as viewed from the spring 142, comprises a spherical contact element 164, which is configured to make contact with a hemispherical recess, such as in an occlusion device. The first section 154 of the first leg 146, at a distal end as viewed from the spring 142, comprises a receptacle, for example, such as in the form of a borehole, a plug connection, a clamp receptacle, a bayonet catch, a detent connection, and the like, for receiving a retaining element, for example for attaching a support device. The second sections 148 and 152 of the two legs 144, 146 furthermore include a plurality of position boreholes 156, 158 for positioning the spring 152. By changing the position boreholes 156, 158 that are used, a position of the spring 142 can be changed and, as a result, the spring force generated by the spring 142 can be adapted by adapting the deflection. The spring force can furthermore be adapted by replacing the spring 142 with another spring having a smaller or larger spring constant. For example, it is also possible for an individual setting device to be provided, by way of which the pressure can be adapted. For example, a hinge could be provided instead of the spring 142, and a setting device could be provided instead of the guide element 160, by way of which the distance between the two sections 150, 154 can be individually set, for example using a threaded spindle. Furthermore, a setting device could be provided instead of the spring 142, for example including a thread that can be set in increments, by way of which the distance between the two sections 150, 154 can be individually set.

Figure 7A:
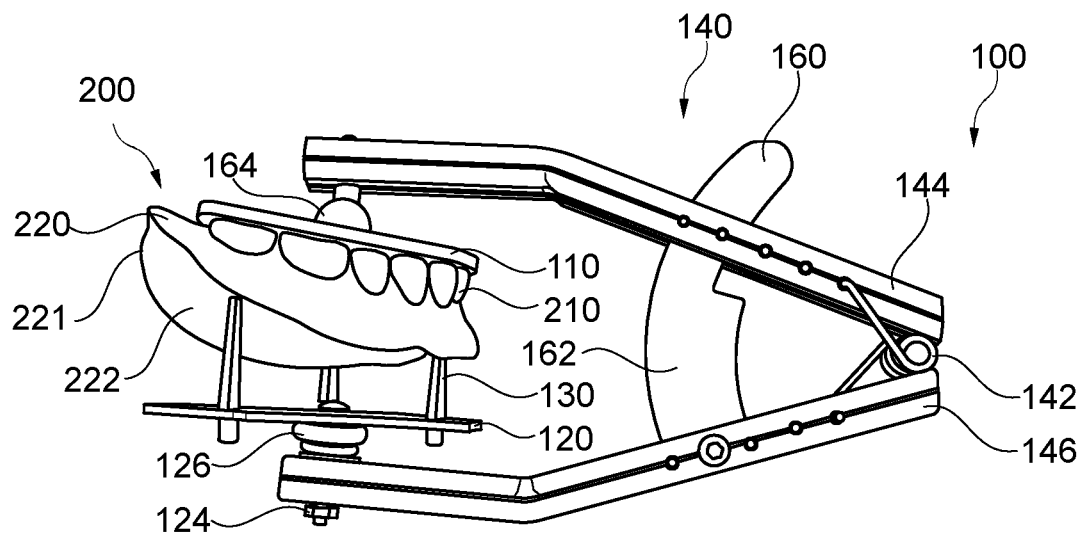
FIG. 7 show an exemplary bonding auxiliary device in conjunction with an exemplary dental prosthesis.
Figure 7B:
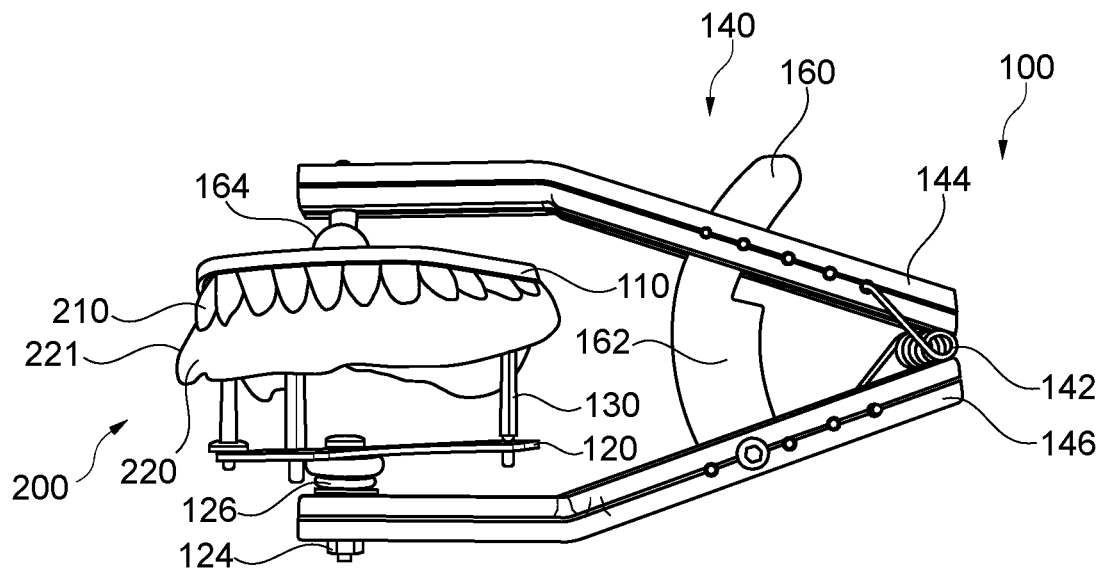

FIGS. 7A and 7B show an exemplary bonding auxiliary device 100 in conjunction with an exemplary dental prosthesis 200. The bonding auxiliary device 100 comprises the occlusion device 110 shown in FIGS. 2 and 3, the support device 120 shown in FIGS. 4, and the clamping element 140 shown in FIG. 6. The clamping element 140 is in contact with the occlusion device 110 via the spherical contact element 164, and is in contact with the support device 120 by way of the retaining element 124. The occlusion device 110 and the support device 120, including the dental prosthesis 200 arranged therebetween, are rotatably mounted relative to the clamping element 140. FIGS. 7A and 7B show views of the occlusion device 110, the support device 120 and the dental prosthesis 200 from different sides.

Figure 8A:
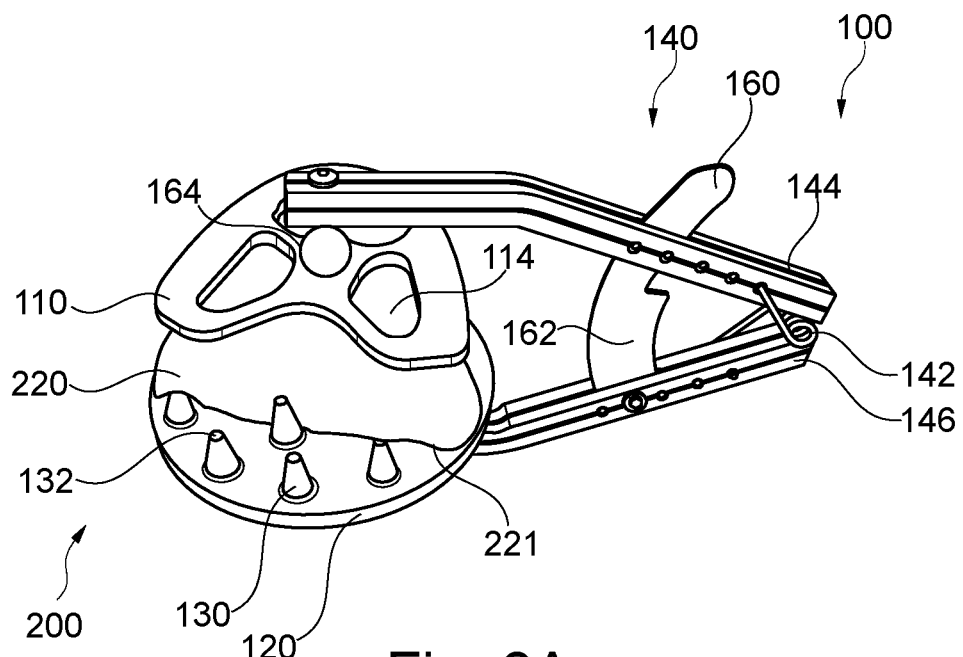
FIG. 8 show an exemplary bonding auxiliary device in conjunction with an exemplary dental prosthesis.
Figure 8B:
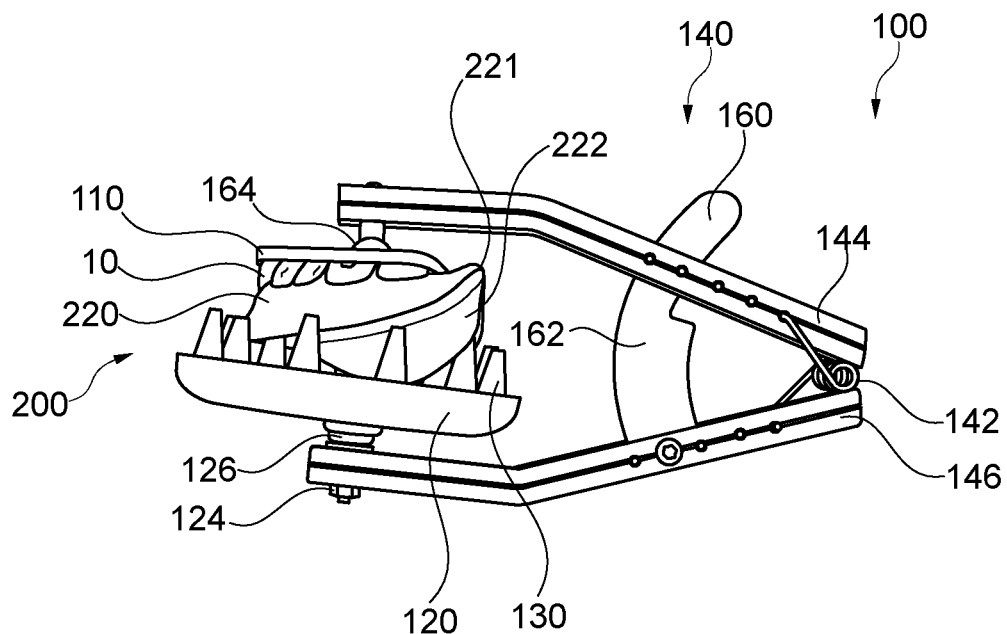

FIGS. 8A and 8B show an exemplary bonding auxiliary device 100 in conjunction with an exemplary dental prosthesis 200. The bonding auxiliary device 100 comprises the occlusion device 110 shown in FIGS. 2 and 3, the support device 120 shown in FIGS. 5, and the clamping element 140 shown in FIG. 6. The clamping element 140 is in contact with the occlusion device 110 via the spherical contact element 164, and is in contact with the support device 120 by way of the retaining element 124. The occlusion device 110 and the support device 120, including the dental prosthesis 200 arranged therebetween, are rotatably mounted relative to the clamping element 140. FIGS. 8A and 8B show views of the occlusion device 110, the support device 120 and the dental prosthesis 200 from different sides.

Figure 9D:
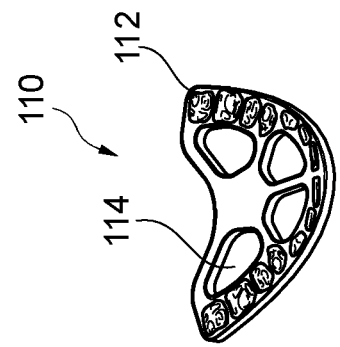
FIG. 9 show exemplary elements of a bonding auxiliary device and an exemplary dental prosthesis.
Figure 9C:
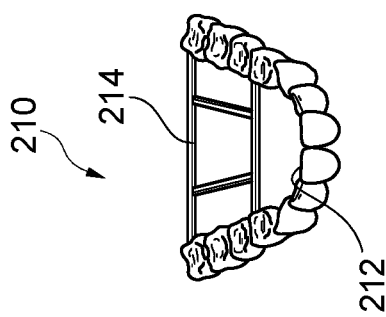
Figure 9B:
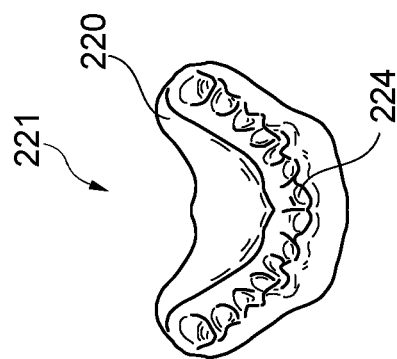
Figure 9A:
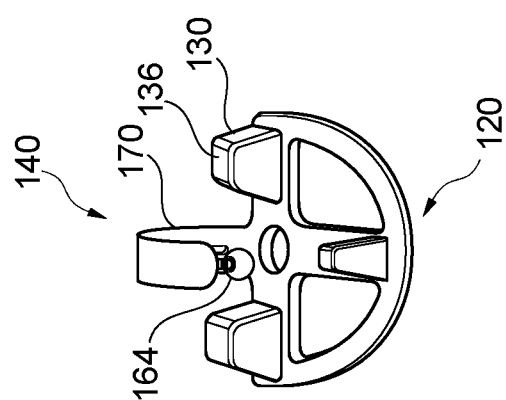

FIGS. 9A to 9D show exemplary elements of a bonding auxiliary device and an exemplary dental prosthesis. The shown elements were printed on a 3D printer, for example. FIG. 9A shows a support device 120 comprising three support elements 130, each of which at a distal end, as viewed from the support device 120, includes a support surface 136, which is, for example, an impression of an underside of the prosthetic body 221 located opposite the gingiva 220 and which is, for example, identical to the shape of a natural gingiva of the patient. The support device 120 is configured in one piece with the support elements 130 and a clamping element 140 in the form of an elastic arc 170. At a distal end, as viewed from the support device 120, the arc 170 comprises a spherical contact element 164, which is configured to make contact with a hemispherical recess 116 (see FIG. 10B) in the occlusion device 110. It is also possible, for example, for multiple clamping elements 140, each being configured as an elastic arc, to be provided or for the clamping element 140 to comprise a plurality of elastic arcs.

FIG. 9B shows a prosthetic body 221 of the dental prosthesis including an artificial gingiva 220, including receptacles 224 for the teeth 210. FIG. 9C shows artificial teeth 210 including dental crowns 212 to be bonded into the receptacles of the gingiva 220. The artificial teeth 210 are still connected by strut sections 214, which result from the printing operation and are removed before the teeth 210 are introduced into the gingiva 220. The teeth 210 can be provided as a complete dental arch, for example. It would likewise be possible for individual teeth or bridges including fewer teeth to be provided. FIG. 9C finally shows an occlusion device 110, which is identical to the occlusion device 110 shown in FIG. 2. The dental impressions 112 of the occlusion device 110 are configured to receive the crowns 212 of the teeth 210.

Figure 10A:
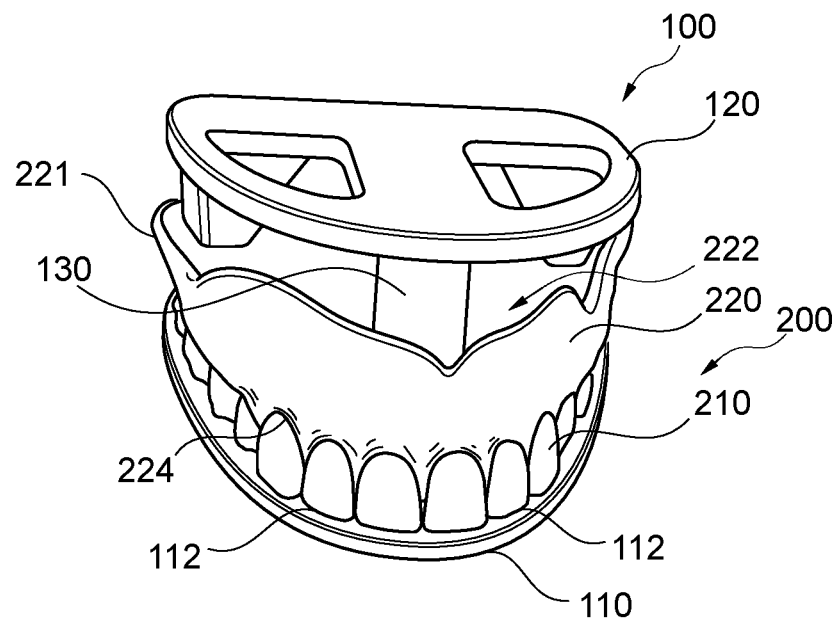
FIG. 10 show an exemplary bonding auxiliary device in conjunction with an exemplary dental prosthesis.
Figure 10B:
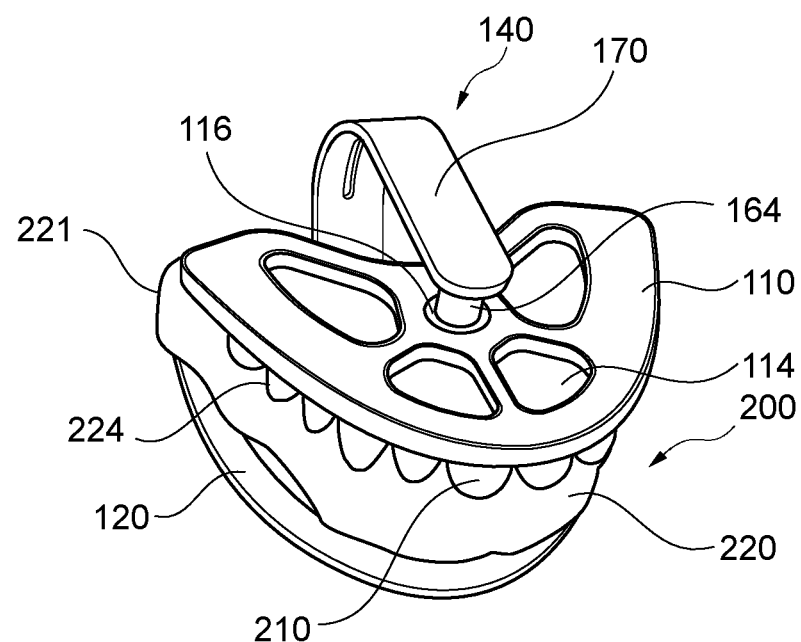

FIGS. 10A and 10B show an exemplary bonding auxiliary device 100 in conjunction with an exemplary dental prosthesis 200. The bonding auxiliary device 100 comprises the support device 120 including the clamping element 140 from FIG. 9A and the occlusion device 110 from FIG. 9D. The dental prosthesis 200 comprises the prosthetic body 221 including the gingiva 220 from FIG. 9B and the teeth 210 from FIG. 9C. The dental prosthesis 200 is furthermore arranged, for example, between the occlusion device 110, in the dental impressions 112 of which the teeth 210 are positioned, and the support device 120, which by way of the support elements 130 supports the prosthetic body of the dental prosthesis 200 at an underside 222 facing away from the gingiva 220. The clamping element 140, by way of the arc 170, applies pressure both onto the support device 120 and onto the occlusion device 110, which transfer this pressure to the dental prosthesis 200 for fixing the teeth 210 in the receptacles 224 of the gingiva 220. FIG. 10A shows a perspective view of the bonding auxiliary device 100, as viewed from the support device 120 arranged beneath the dental prosthesis 200. FIG. 10B shows a perspective view of the bonding auxiliary device 100, as viewed from the occlusion device 110 arranged above the dental prosthesis 200.

Figure 11A:
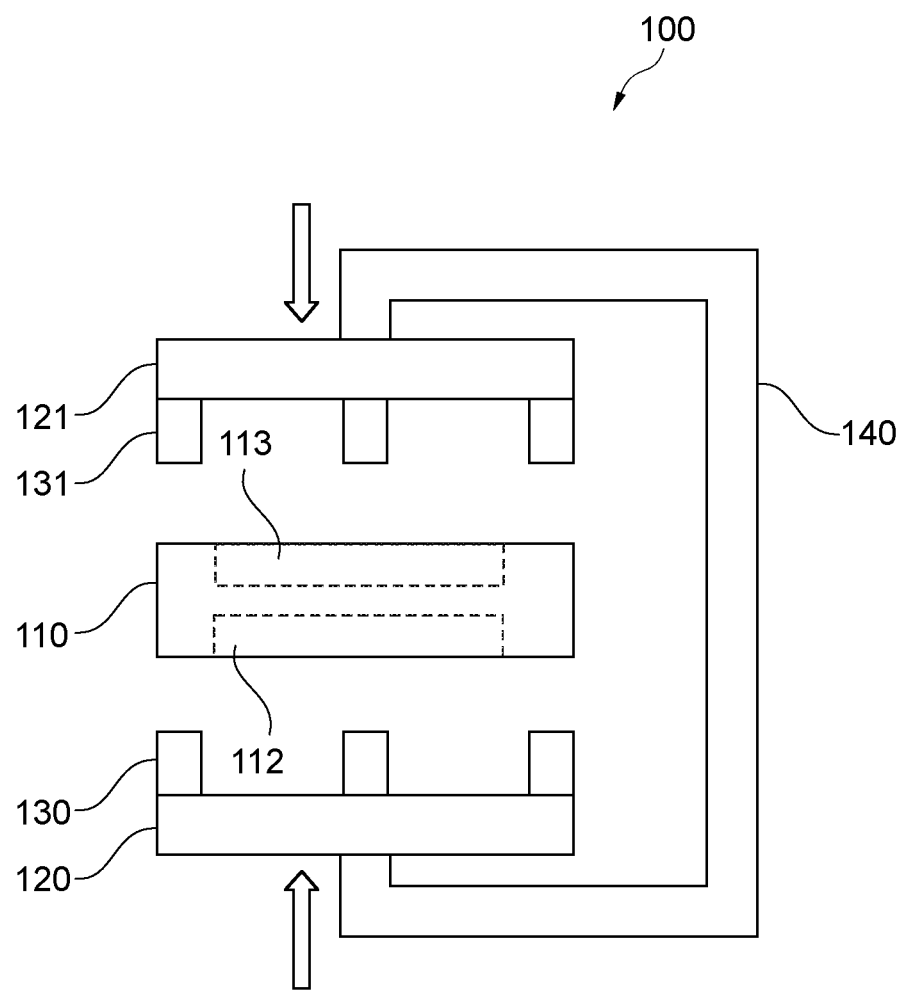
FIG. 11 show exemplary bonding auxiliary devices.

FIG. 11A shows a schematic view of an exemplary bonding auxiliary device 100. The bonding auxiliary device 100 comprises an occlusion device 110, which on each of two mutually opposing sides comprises one or more impressions 112, 113 of teeth. The bonding auxiliary device 100 furthermore comprises two support devices 120, 121, which each comprise one or more support elements 130, 131. A clamping element 140 of the bonding auxiliary device 100 is configured to apply pressure onto the two support devices 120, 121. The components 110, 120, 121, 140 of the bonding auxiliary device 100 are arranged in such a way, for example, that the pressure applied by the clamping element 140 onto the support devices 120, 121, the directions of which are indicated by the two arrows directed toward one another in FIG. 11, is directed toward the dental impressions 112, 113 of the occlusion device 110. The occlusion device 110 is arranged between the two support devices 120, 121, for example. The support devices 120, 121 and the occlusion device 110 are arranged in such a way, for example, that, while the pressure is being applied, the dental impressions 112, 113 of the occlusion device 140 each face the support elements 130, 131 of one of the support devices 120, 121. The clamping element 140 is configured to make contact with the support devices 120, 121 for applying pressure, either directly or indirectly by way of intermediate components. For example, the clamping element 140 is connected to the support devices 120, 121 so as to be non-destructively detachable or not non-destructively detachable. For example, the clamping element 140 is configured in one piece with one or both support devices 120, 121.

Figure 11B:
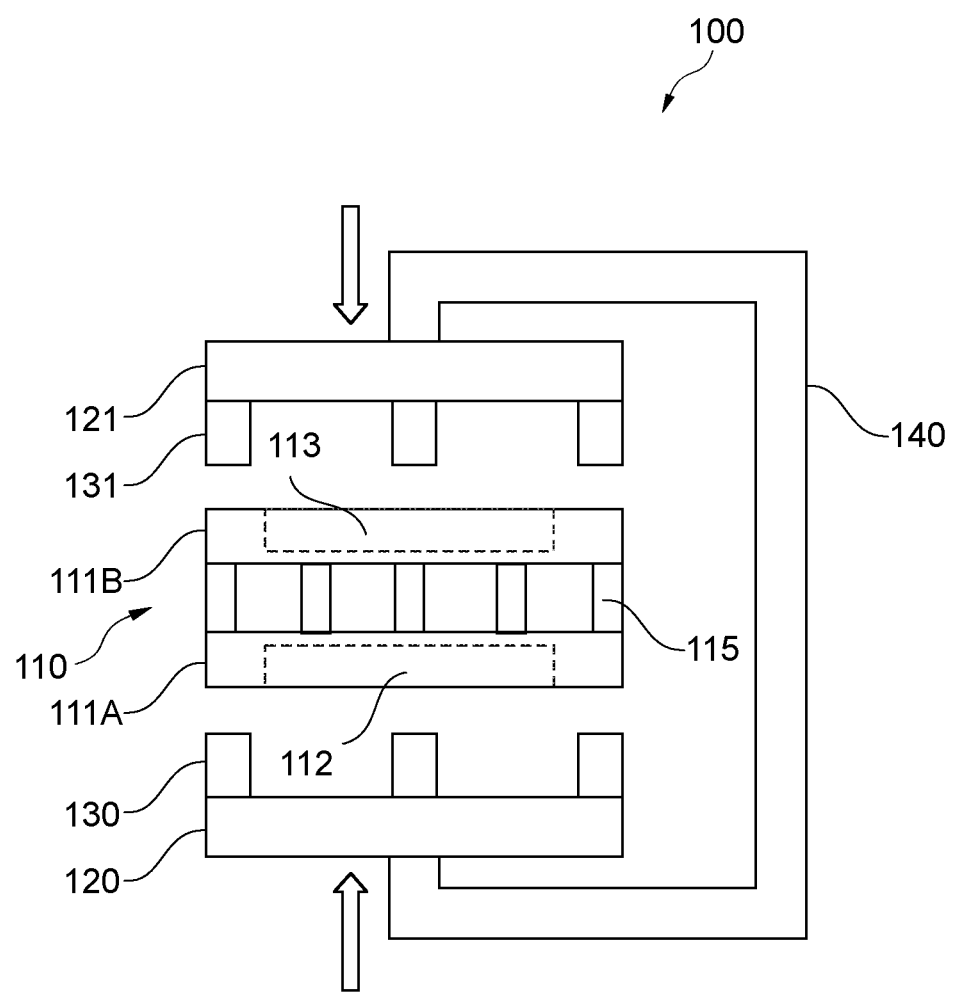

FIG. 11B shows a schematic view of an exemplary bonding auxiliary device 100, which, except for the configuration of the occlusion device 110, corresponds to the bonding auxiliary device 100 in FIG. 11A. The occlusion device 110 in FIG. 11B is configured, for example, as a double element, such as a double plate, comprising two occlusion elements 111A, 111B, such as plate elements, arranged parallel to one another. On sides that face away from one another, each of the two occlusion elements 111A, 111B includes one or more impressions 112, 113 of teeth. Furthermore, the two occlusion elements 111A, 111B are spaced apart from one another by spacer elements 115. The spacer elements 115 extend, for example, perpendicularly between the occlusion elements 111A, 111B. For example, the occlusion elements 111A, 111B additionally each include one or more through-openings. The through-openings enable access to one or more receptacles of a first gingiva of a first dental prosthesis, which can be arranged between the occlusion device 110 and the support device 120, and to one or more receptacles of a second gingiva of a first dental prosthesis, which can be arranged between the occlusion device 110 and the support device 120. The occlusion elements 111A, 111B can, for example, each be configured similarly to the occlusion device 110 shown in FIG. 2, without the recess 116.

Figure 12:
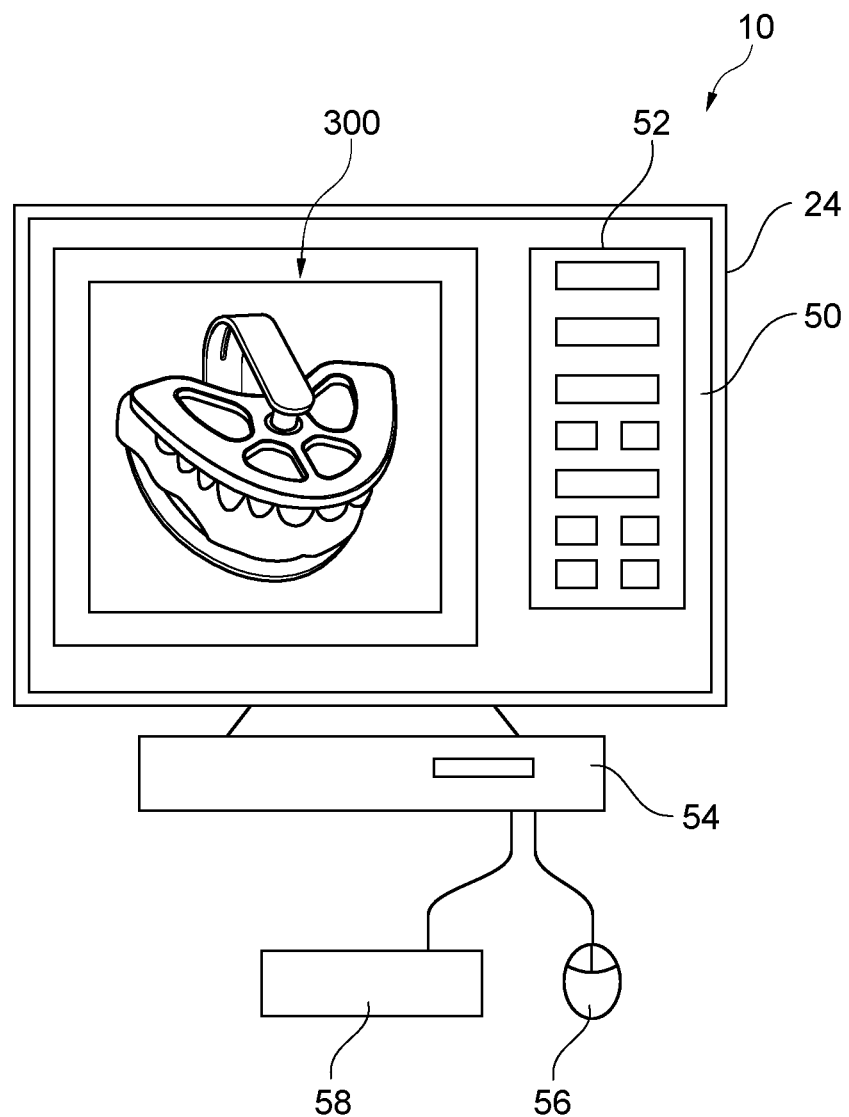
FIG. 12 shows an exemplary computer system for creating a computer model of a bonding auxiliary device.

FIG. 12 shows an exemplary computer system 10 for creating a computer model 300 of a bonding auxiliary device, using a computer model of a dental prosthesis to be created and joined by bonding. The computer system 10 can, for example, include a hardware component 54 comprising one or more processors as well as a memory for storing machine-executable program commands. The processors executing the program commands can prompt the one or more processors to control the computer system 10 so as to design the digital model 300 of the bonding auxiliary device. The computer system 10 can furthermore comprise external input devices, such as a keyboard 54 and a mouse 56, which allow the user to interact with the computer system 10. In addition, the computer system 10 can comprise output devices, such as a monitor 24 comprising a user interface 50 comprising control elements 52, which allow the user to control the design of the digital model 300 of the bonding auxiliary device with the aid of the computer system 10. The generated digital model 300 can, for example, be represented on the user interface 50.

Figure 13:
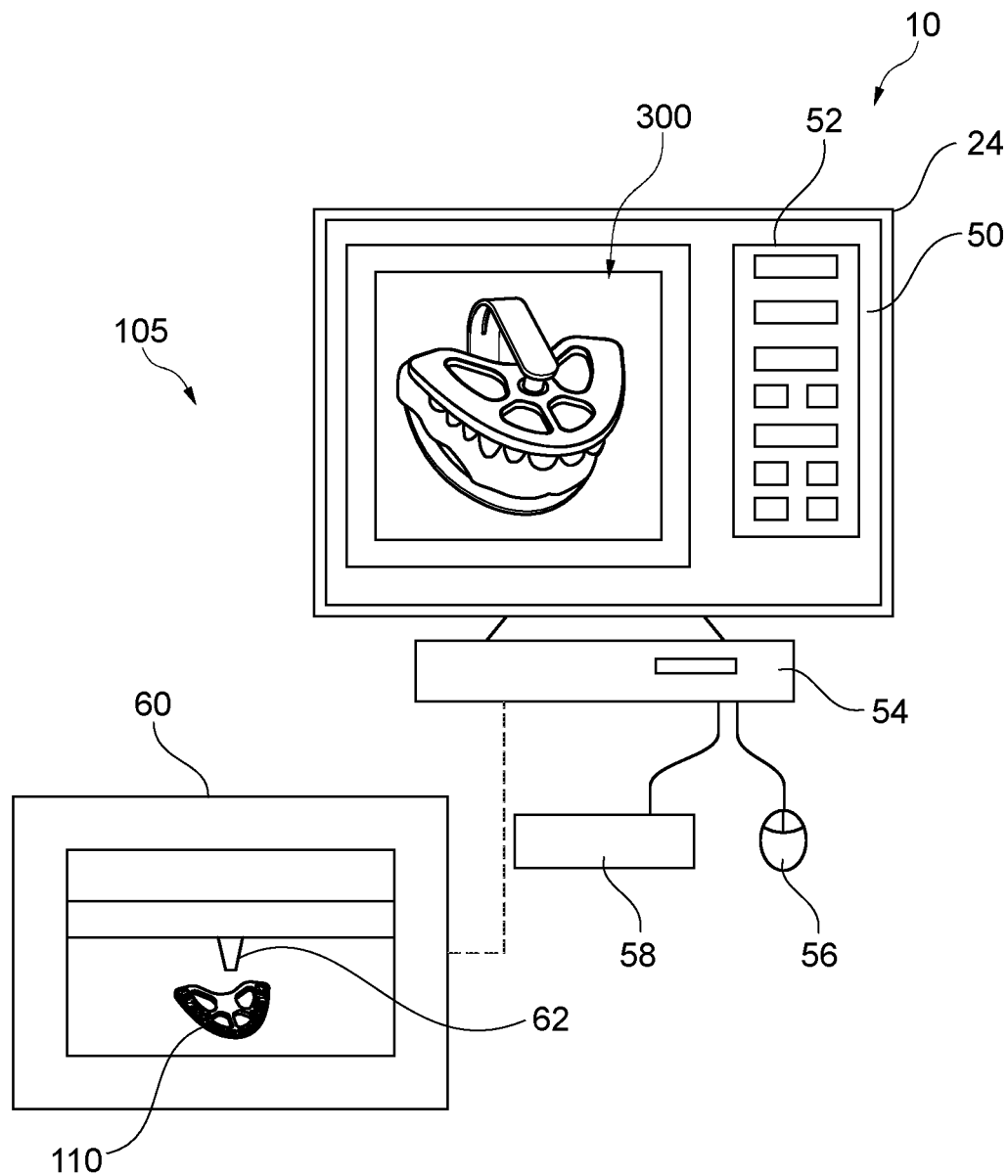
FIG. 13 shows an exemplary production system for producing a bonding auxiliary device.

FIG. 13 shows an exemplary production system 105 for producing a bonding auxiliary device 100 and/or of the elements thereof. The production system 105 can comprise the computer system 10 from FIG. 12. The computer system 10 can furthermore be configured so as to control a 3D printer 60 for producing one or more elements of the bonding auxiliary device 100 according to the digital model 300 designed on the computer system 10. For example, an occlusion device 110 can be printed. The 3D printer 60 can comprise a printing element 62, which is configured so as to print the elements of the bonding auxiliary device 100, such as the occlusion device 100, layer by layer. If the 3D printer 60 is able, for example, to print different materials, the printer can be used to print multiple elements of the bonding auxiliary device 100 as well as possibly a dental prosthesis 200. If the 3D printer 60 is only able to print a single material, for example, multiple 3D printers 60 can be used to print the different elements of the bonding auxiliary device 100 and/or of the dental prosthesis 200.

Figure 14:
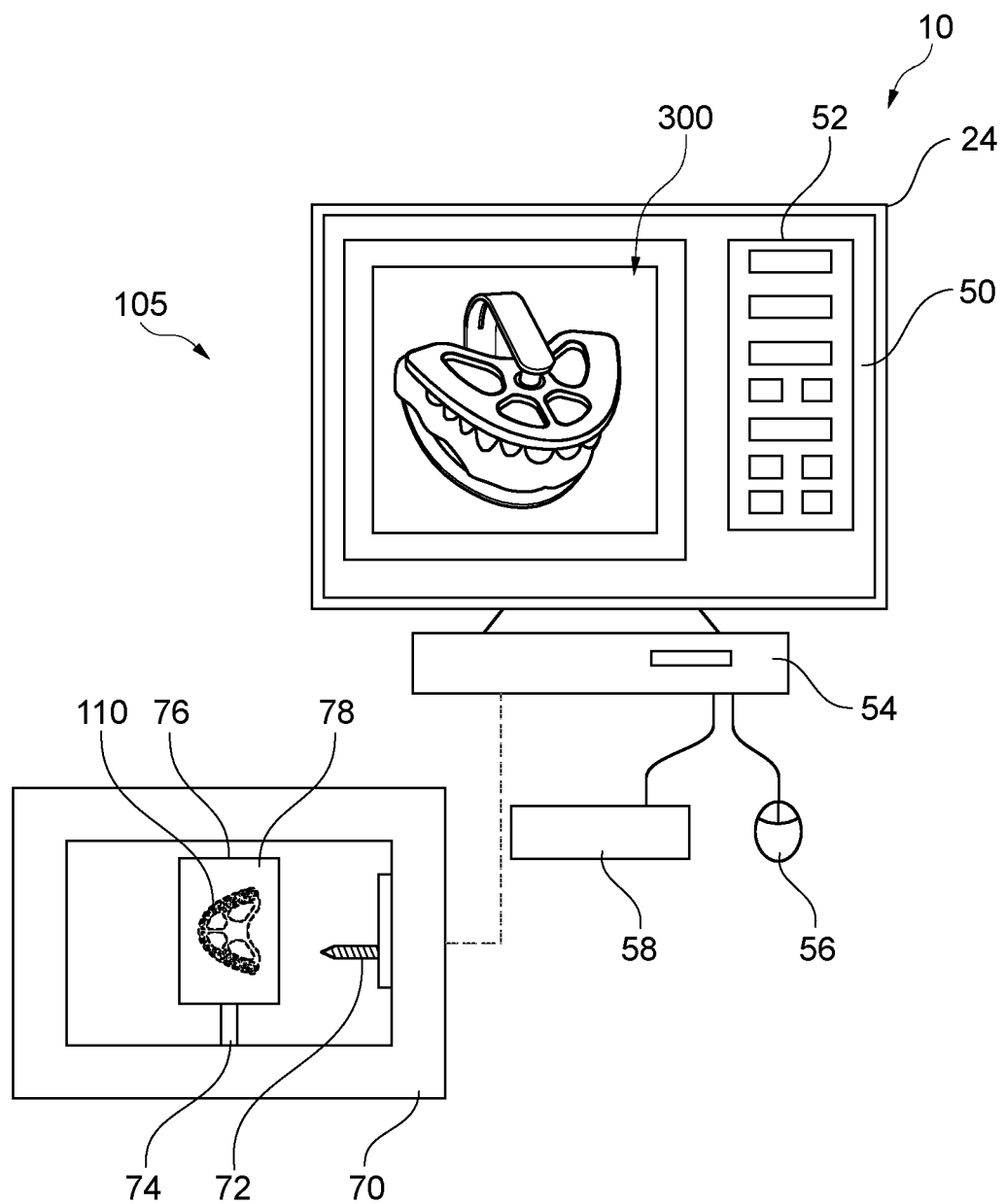
FIG. 14 shows an exemplary production system for producing a bonding auxiliary device.

FIG. 14 shows another exemplary production system 105 for producing a bonding auxiliary device 100 and/or of the elements thereof. The production system 105 can comprise the computer system 10 from FIG. 12. The computer system 10 can furthermore be configured so as to control a processing device 70, which is configured to process a blank 76, using one or more processing tools 72. The blank 76 made of material 78 can be provided using a retaining device 74 and be cut or milled into a desired final shape and size of the element to be produced. For example, the one or more processing tools 72 are used in the process for carrying out a material removal process controlled by the computer system 10. For example, an occlusion device 110 can be produced from the blank 76. The processing tool 72 can be a milling tool, for example. The processing device 70 can also be used to produce other elements of the bonding auxiliary device 100 as well as possibly the dental prosthesis 200. Depending on the design, the computer system 10 can be configured to additionally use one or more further processing devices 70 and/or one or more 3D printers 60.

Figure 15:
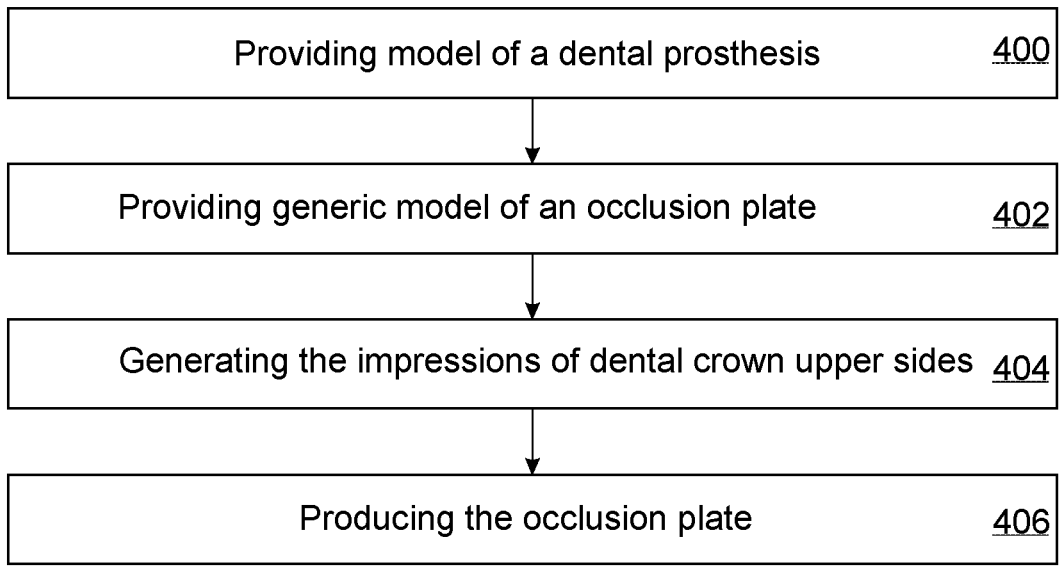
FIG. 15 shows a schematic flow chart of an exemplary method for producing an occlusion device for a bonding auxiliary device.

FIG. 15 shows a schematic flow chart of an exemplary method for producing an occlusion device for a bonding auxiliary device. In block 400, a three-dimensional computer model of a dental prosthesis to be produced is provided. The dental prosthesis comprises, for example, a plurality of artificial teeth having a predefined occlusion, which are arranged in an artificial gingiva of a prosthetic body. In block 402, a generic three-dimensional computer model of an occlusion device is provided, and in block 404, impressions of dental crown upper sides of the teeth are generated in the three-dimensional computer model of the occlusion device, in which the crowns of the teeth can be positioned for arrangement and alignment. In block 406, the occlusion device is produced, using the three-dimensional computer model of the occlusion device including the impressions of the dental crown upper sides. For example, the occlusion device is printed by way of a 3D printer or produced using a machining process.

Figure 16:
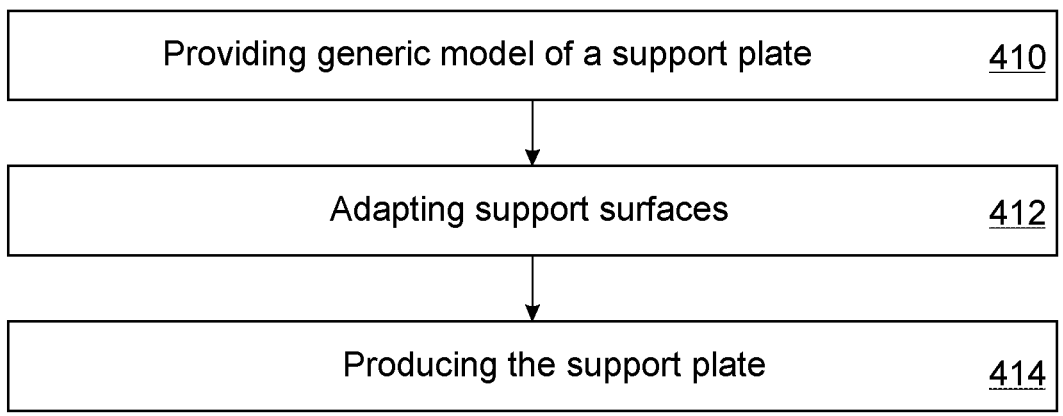
FIG. 16 shows a schematic flow chart of an exemplary method for producing a support device for a bonding auxiliary device.

FIG. 16 shows a schematic flow chart of an exemplary method for producing a support device for a bonding auxiliary device. In block 410, a generic three-dimensional computer model of a first support device for supporting a prosthetic body of a dental prosthesis comprising one or more second support elements is provided, which are arranged at the support device. Each of the support elements includes a support surface, which is intended to make contact in each case with a contact surface of an underside of the prosthetic body facing away from the gingiva. In block 412, the shapes of the support surfaces are adapted so that the shapes in each case represent a negative imprint of the shape of the particular contact surface. For example, scan data of a surface scan of the natural gingiva of the patient is used for the adaptation. In block 414, the support device is produced, using the three-dimensional computer model of the support device including adapted support surfaces. For example, the support device is printed by way of a 3D printer or produced using a machining process.

Figure 17:
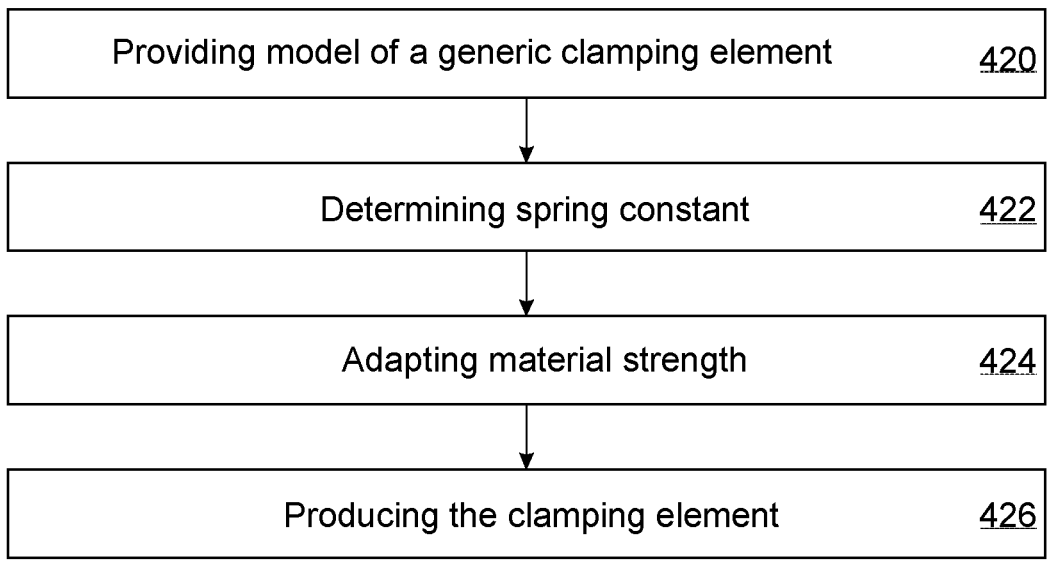
FIG. 17 shows a schematic flow chart of an exemplary method for producing a clamping element for a bonding auxiliary device.

FIG. 17 shows a schematic flow chart of an exemplary method for producing a clamping element for a bonding auxiliary device. In block 420, a three-dimensional computer model of a generic clamping element is provided. The clamping element is configured to apply pressure, for example, onto an occlusion device and onto a support device, for fixing teeth that are arranged and aligned by means of the occlusion device in an artificial gingiva of a prosthetic body supported by means of the support device. The clamping element comprises one or more elastic arcs, which extend, for example, from the support device to the occlusion device. In block 422, a spring constant of the one or more arcs is determined, which by means of a spring force applies a predefined pressure onto the occlusion device and the support device when a dental prosthesis is arranged between the occlusion device and the support device. In the case of multiple arcs, the spring constant is, for example, a combination, such as a sum, of the spring constants of the individual arcs. In block 424, the material thickness of the one or more arcs of the three-dimensional computer model is in each case adapted so that the one or more arcs have the determined spring constant. In block 426, the clamping element is produced, using the three-dimensional computer model with the one or more arcs having the adapted material thickness. For example, the clamping element is produced in addition to the support device or in one piece therewith. For example, the clamping element is printed by way of a 3D printer or produced using a machining process.

Figure 18:
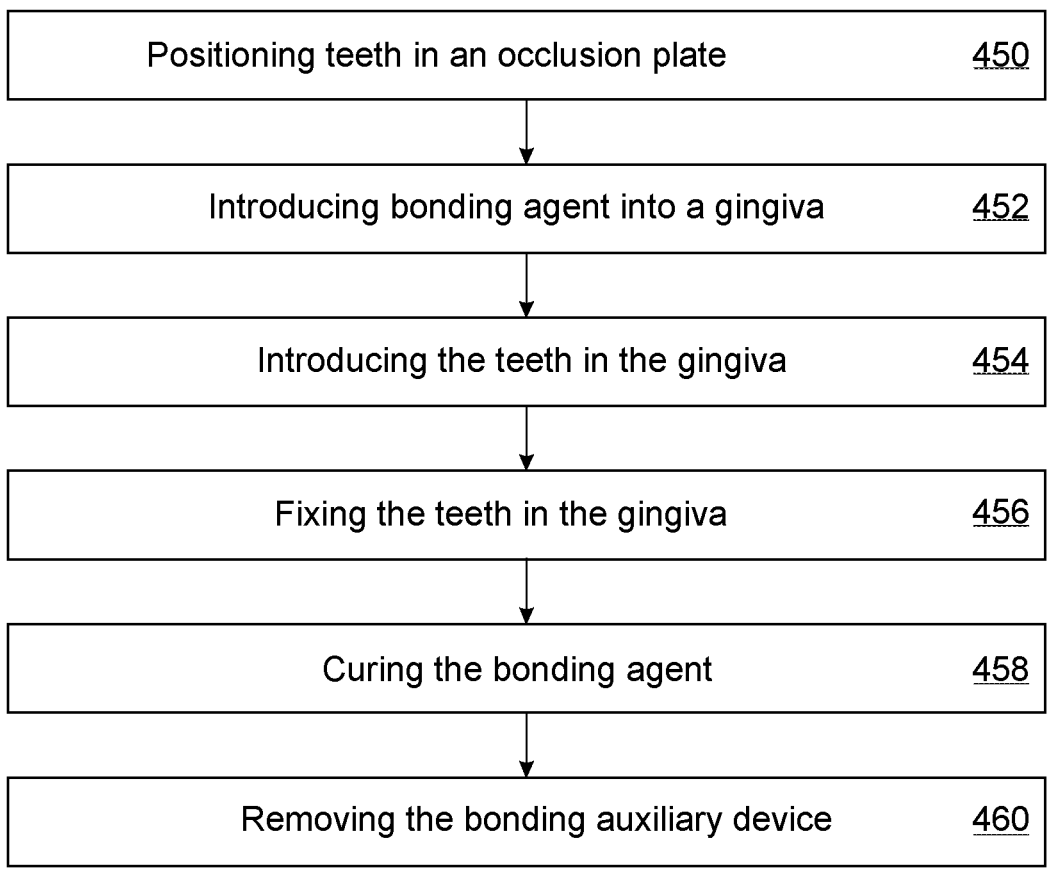
FIG. 18 shows a schematic flow chart of an exemplary method for using a bonding auxiliary device for bonding a plurality of teeth into an artificial gingiva.

FIG. 18 shows a schematic flow chart of an exemplary method for using a bonding auxiliary device for bonding a plurality of teeth into an artificial gingiva. In block 450, the teeth are arranged and aligned in an occlusion device of the bonding auxiliary device with impressions of dental crown upper sides of the teeth in the corresponding impressions. The crowns of the teeth are positioned in the impressions of the occlusion device and held by the same in the corresponding position. In block 452, a bonding agent is introduced into one or more receptacles of the gingiva for the teeth. In block 454, the teeth are introduced into the appropriately prepared receptacles of the gingiva. In block 456, the teeth are fixed in the first gingiva, using a clamping element of the bonding auxiliary device. The underside of a prosthetic body of the dental prosthesis is supported by a support device of the bonding auxiliary device and, using the clamping element, pressure is applied onto the occlusion device and onto the support device. In block 458, the bonding agent is cured, for example using a light curing device. In block 460, the bonding auxiliary device is finally removed again, that is, the clamping element, the occlusion device and the support device.

LIST OF REFERENCE NUMERALS 10 computer system
24 monitor
50 user interface
52 control elements
54 hardware component
56 external device
58 external device
60 3D printer
62 printing element
70 processing device
72 processing tool
74 retaining device
76 blank
78 material
100 bonding auxiliary device
110 occlusion device
111A occlusion element
111B occlusion element
112 impressions
113 impressions
114 through-openings
115 spacer element
116 spherical recess
120 support device
121 support device
122 position boreholes
124 retaining element
126 elastic element
130 support element
131 support element
132 tip
134 thread
136 support surface
140 clamping element
142 spring
144 leg
146 leg
148 section
150 section
152 section
154 section
156 position borehole
158 position borehole
160 guide element
162 limiting element
164 spherical contact element
170 arc
200 dental prosthesis
210 teeth
212 dental crown
214 strut section
220 gingiva
221 prosthetic body
222 underside
224 receptacle
300 computer model

The invention claimed is:

1. A bonding auxiliary device for arranging, aligning and fixing a plurality of first artificial teeth to be bonded into a first artificial gingiva of a first dental prosthesis, the bonding auxiliary device comprising:
an occlusion device for arranging and aligning the first artificial teeth relative to one another according to a predefined occlusion;
a first support device for supporting a first prosthetic body of the first dental prosthesis comprising the first artificial gingiva, comprising one or more first support elements, which are arranged on a first side of the first support device; and
a clamping element for fixing the first artificial teeth, which are arranged and aligned by means of the occlusion device, in the first artificial gingiva,
on a first side, the occlusion device comprising first impressions of dental crown upper sides of the first artificial teeth according to the predefined occlusion, in which the dental crowns of the first artificial teeth can be positioned for arrangement and alignment,
the clamping element being configured to apply pressure onto a second side of the occlusion device facing away from the first side of the occlusion device, and onto a second side of the first support device facing away from the first side of the first support device, for fixing the first artificial teeth, which are arranged and aligned by means of the occlusion device, in the first artificial gingiva of the first prosthetic body that is supported by means of the first support device.

2. The bonding auxiliary device according to claim 1, wherein the clamping element is configured to apply a predefined pressure onto the occlusion device and the first support device.

3. The bonding auxiliary device according to claim 2, wherein the clamping element is a prosthesis-specific clamping element, which is configured to apply a prosthesis-specific predefined pressure onto the occlusion device and the first support device when the first dental prosthesis, including the first artificial teeth and the first artificial gingiva, is arranged between the occlusion device and the first support device.

4. The bonding auxiliary device according to claim 2, wherein the clamping element comprises a spring, the spring being configured to generate a spring force, as a function of a position and/or spring constant of the spring, which applies the predefined pressure onto the occlusion device and the first support device.

5. The bonding auxiliary device according to claim 4, wherein the clamping element comprises a first and a second leg, which are connected to one another so as to be pivotable relative to one another about a shared pivot axis, the two legs being connected to one another via the spring arranged between the two legs.

6. The bonding auxiliary device according to claim 2, wherein the clamping element comprises one or more elastic arcs, which extend from the first support device to the occlusion device and have a spring constant that is configured to apply, by means of spring force, the predefined pressure onto the occlusion device and the first support device.

7. The bonding auxiliary device according to claim 1, wherein the clamping element comprises a setting device for setting a pressure that is applied onto the occlusion device and the first support device.

8. The bonding auxiliary device according to claim 1, wherein the occlusion device has a plurality of through-openings enabling access to one or more receptacles in the first artificial gingiva for receiving the first artificial teeth.

9. The bonding auxiliary device according to claim 1, wherein one or more of the first support elements are each connected to the first support device in a non-destructively detachable manner, the first support device being configured to predefine a plurality of positions for each of the corresponding first support elements, at which the corresponding support element can be connected to the support device.

10. The bonding auxiliary device according to claim 1, wherein the bonding auxiliary device is furthermore configured for arranging, aligning and fixing a plurality of second artificial teeth to be bonded into a second artificial gingiva of a second dental prosthesis, the first dental prosthesis being intended for a first jaw, and the second dental prosthesis being intended for a second jaw, the second jaw being an opposing jaw relative to the first jaw,
- the bonding auxiliary device comprising a second support device for supporting a second prosthetic body of the second dental prosthesis comprising the second artificial gingiva, comprising one or more second support elements, which are arranged on a first side of the second support device,
- on a second side facing away from the first side of the occlusion device, the occlusion device comprising second impressions of dental crown upper sides of the second artificial teeth according to the predefined occlusion, in which the dental crowns of the second artificial teeth can be positioned for arrangement and alignment, and
- the clamping element being configured to apply pressure onto the second side of the occlusion device via a second side of the second support device facing away from the first side of the second support device, the applied pressure furthermore being configured for fixing the second artificial teeth, which are arranged and aligned by means of the occlusion device, in the second artificial gingiva of the second prosthetic body that is supported by means of the second support device.

11. A system comprising a bonding auxiliary device according to claim 1 and a first dental prosthesis comprising a plurality of first artificial teeth to be bonded into a first artificial gingiva of a first prosthetic body of the first dental prosthesis.

12. The system according to claim 11, furthermore comprising a second dental prosthesis comprising a plurality of second artificial teeth to be bonded into a second artificial gingiva of a second prosthetic body of the second dental prosthesis.

13. A method for producing an occlusion device for a bonding auxiliary device, using a computer system, the method comprising:
- providing a three-dimensional computer model of a first dental prosthesis to be produced, wherein the first dental prosthesis comprises a plurality of first artificial teeth having a predefined occlusion, which are arranged in a first artificial gingiva of a first prosthetic body;
- providing a generic three-dimensional computer model of an occlusion device;
- generating first impressions of dental crown upper sides of the first artificial teeth in a first side of the three-dimensional computer model of the occlusion device in which the dental crowns of the first artificial teeth can be positioned for arrangement and alignment;
- producing the occlusion device, using the three-dimensional computer model of the occlusion device including the first impressions of the dental crown upper sides of the first artificial teeth;
- providing a generic three-dimensional computer model of a first support device for supporting a first prosthetic body of the first dental prosthesis comprising the first artificial gingiva, comprising one or more first support elements, which are arranged on a first side of the first support device, wherein the one or more first support elements arranged at the first support device in each case comprise a support surface, which is intended to make contact in each case with a contact surface of an underside of the first prosthetic body located opposite the first artificial gingiva;
- adapting shapes of support surfaces so that the shapes in each case represent a negative imprint of the shape of the particular contact surface;
- producing the first support device, using the three-dimensional computer model of the first support device including adapted support surfaces;
- providing a three-dimensional computer model of a generic clamping element, which is configured to apply pressure onto a second side of the occlusion device facing away from the first side of the occlusion device, and onto a second side of the first support device facing away from the first side of the first support device, for fixing the first artificial teeth, which are arranged and aligned by means of the occlusion device, in the first artificial gingiva of the first prosthetic body that is supported by means of the first support device, the clamping element comprising one or more elastic arcs;
- determining a spring constant for the one or more arcs with which a predefined pressure is applied onto the occlusion device and the first support device when the first dental prosthesis is arranged between the occlusion device and the first support device;
- adapting the material thickness of the one or more arcs of the three-dimensional computer model so that one or more arcs have the determined spring constant; and
- producing the clamping element, using the three-dimensional computer model of the one or more arcs having the adapted material thickness.

14. The method according to claim 13, wherein the method furthermore comprises:
- providing a three-dimensional computer model of a second dental prosthesis to be produced, wherein the second dental prosthesis comprises a plurality of second artificial teeth having a predefined occlusion, which are arranged in a second artificial gingiva of a second prosthetic body; and
- generating second impressions of dental crown upper sides of the second artificial teeth in a second side of the three-dimensional computer model of the occlusion device facing away from the first side of the occlusion device, in which the dental crowns of the second artificial teeth can be positioned for arrangement and alignment,
- for producing the occlusion device, the three-dimensional computer model of the occlusion device, including the first and second impressions of the dental crown upper side of the first and second artificial teeth, being used.

15. The method according to claim 14, wherein the method furthermore comprises:
- providing a generic three-dimensional computer model of a second support device for supporting a second prosthetic body of the second dental prosthesis comprising the second artificial gingiva, comprising one or more second support elements, which are arranged on a first side of the second support device, wherein the one or more second support elements arranged at the second support device in each case comprise a support surface, which is intended to make contact in each case with a contact surface of an underside of the second prosthetic body located opposite the second artificial gingiva;

adapting shapes of support surfaces so that the shapes in each case represent a negative imprint of the shape of the particular contact surface; and producing the second support device, using the three-dimensional computer model of the second support device with adapted support surfaces.

16. The method according to claim 14, wherein the clamping element according to the three-dimensional computer model of the generic clamping element is configured to apply pressure onto a second side of the first support device facing away from the first side of the first support device, and onto a second side of the second support device facing away from the first side of the second support device, for fixing the second artificial teeth, which are arranged and aligned by means of the occlusion device, in the second artificial gingiva of the second prosthetic body that is supported by means of the second support device, the one or more elastic arcs extending from the first support device to the second support device, the spring constant of the one or more arcs being determined with which the predefined pressure is applied onto the first and second support devices when the first and second dental prostheses are arranged between the first and second support devices, the material thickness of the one or more arcs of the three-dimensional computer model being adapted so that the one or more arcs have the determined spring constant, and the clamping element being produced using the three-dimensional computer model of the one or more arcs having the adapted material thickness.

17. A method for using a bonding auxiliary device for bonding a plurality of first artificial teeth into a first artificial gingiva, the bonding auxiliary device comprising:

an occlusion device for arranging and aligning the first artificial teeth relative to one another according to a predefined occlusion;

a first support device for supporting a first prosthetic body of the first dental prosthesis comprising the first artificial gingiva, comprising one or more first support elements, which are arranged on a first side of the first support device; and a clamping element for fixing the first artificial teeth, which are arranged and aligned by means of the occlusion device, in the first artificial gingiva, on a first side, the occlusion device comprising first impressions of dental crown upper sides of the first artificial teeth according to the predefined occlusion, in which the dental crowns of the first artificial teeth can be positioned for arrangement and alignment, the clamping element being configured to apply pressure onto a second side of the occlusion device facing away from the first side of the occlusion device, and onto a second side of the first support device facing away from the first side of the first support device, for fixing the first artificial teeth, which are arranged and aligned by means of the occlusion device, in the first artificial gingiva of the first prosthetic body that is supported by means of the first support device, the method comprising:
arranging and aligning the first artificial teeth in the occlusion device, wherein the dental crowns of the first artificial teeth are positioned in the first impressions of the occlusion device;

introducing a bonding agent into the first artificial gingiva;

introducing the first artificial teeth into the first artificial gingiva;

fixing the first artificial teeth in the first artificial gingiva, wherein an underside of the first prosthetic body is supported by the first support device and, using the clamping element, pressure is applied onto the second side of the occlusion device and onto the second side of the first support device;

curing the bonding agent; and removing the bonding auxiliary device.

18. The method according to claim 17, wherein the bonding auxiliary device is furthermore configured for arranging, aligning and fixing a plurality of second artificial teeth to be bonded into a second artificial gingiva of a second dental prosthesis, the first dental prosthesis being intended for a first jaw, and the second dental prosthesis being intended for a second jaw, the second jaw being an opposing jaw relative to the first jaw, the bonding auxiliary device comprising a second support device for supporting a second prosthetic body of the second dental prosthesis comprising the second artificial gingiva, comprising one or more second support elements, which are arranged on a first side of the second support device, on a second side facing away from the first side of the occlusion device, the occlusion device comprising second impressions of dental crown upper sides of the second artificial teeth according to the predefined occlusion, in which the dental crowns of the second artificial teeth can be positioned for arrangement and alignment, and the clamping element being configured to apply pressure onto the second side of the occlusion device via a second side of the second support device facing away from the first side of the second support device, the applied pressure furthermore being configured for fixing the second artificial teeth, which are arranged and aligned by means of the occlusion device, in the second artificial gingiva of the second prosthetic body that is supported by means of the second support device, the method further comprising:
arranging and aligning the second artificial teeth in the occlusion device, wherein the dental crowns of the second artificial teeth are positioned in the second impressions of the occlusion device;

introducing a bonding agent into the second artificial gingiva;

introducing the second artificial teeth into the second artificial gingiva; and fixing the second artificial teeth in the second artificial gingiva, wherein an underside of a second prosthetic body is supported by the second support device and, using the clamping element, pressure is applied onto the second side of the second support device so that the pressure is applied onto the second side of the occlusion device via the second support device and the second dental prosthesis.

* * * * *